United States Patent
Zaizen et al.

(10) Patent No.: US 11,962,184 B2
(45) Date of Patent: Apr. 16, 2024

(54) METHOD FOR PRODUCING NON-ORIENTED ELECTRICAL STEEL SHEET, METHOD FOR PRODUCING MOTOR CORE, AND MOTOR CORE

(71) Applicant: JFE Steel Corporation, Tokyo (JP)

(72) Inventors: Yoshiaki Zaizen, Tokyo (JP); Yoshihiko Oda, Tokyo (JP); Tomoyuki Okubo, Tokyo (JP); Takaaki Tanaka, Tokyo (JP); Yukino Miyamoto, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 298 days.

(21) Appl. No.: 17/617,732

(22) PCT Filed: Jun. 15, 2020

(86) PCT No.: PCT/JP2020/023366
§ 371 (c)(1),
(2) Date: Dec. 9, 2021

(87) PCT Pub. No.: WO2020/262063
PCT Pub. Date: Dec. 30, 2020

(65) Prior Publication Data
US 2022/0278566 A1 Sep. 1, 2022

(30) Foreign Application Priority Data
Jun. 28, 2019 (JP) ................................ 2019-120669

(51) Int. Cl.
*H02K 1/02* (2006.01)
*B32B 15/00* (2006.01)
(Continued)

(52) U.S. Cl.
CPC .............. *H02K 1/02* (2013.01); *B32B 15/011* (2013.01); *C21D 6/005* (2013.01); *C21D 6/008* (2013.01);
(Continued)

(58) Field of Classification Search
CPC ...... H02K 1/02; H02K 15/02; H02K 2213/03; B32B 15/011; B32B 2307/732;
(Continued)

(56) References Cited

U.S. PATENT DOCUMENTS

2003/0129444 A1* 7/2003 Matsuoka ............. C23C 2/0222
428/659
2006/0185767 A1 8/2006 Arita et al.
(Continued)

FOREIGN PATENT DOCUMENTS

| CA | 3051823 A1 | 8/2018 |
| CA | 3054114 A1 | 10/2018 |

(Continued)

OTHER PUBLICATIONS

International Search Report and Written Opinion for International Application No. PCT/JP2020/023366, dated Sep. 1, 2020, 8 pages.
(Continued)

*Primary Examiner* — Thomas Truong
(74) *Attorney, Agent, or Firm* — Buchanan Ingersoll & Rooney PC (57) ABSTRACT

In the production of a non-oriented electrical steel sheet by subjecting a steel slab having a certain component composition to a hot rolling, a hot-band annealing, a cold rolling and a finish annealing, the conditions of the finish annealing are controlled such that a yield stress of the steel sheet after the finish annealing is not less than 480 MPa. Also, when a motor core is produced by using the above steel sheet, there can be provided a non-oriented electrical steel sheet capable (Continued)

of producing a rotor core and a stator core as the same raw material where the stator core is subjected to a stress relief annealing at a soaking temperature of 780 to 950° C. in an atmosphere having a nitrogen content of not more than 30 vol % and a dew point of not higher than −20° C., while a motor core is produced with such a steel sheet.

20 Claims, 3 Drawing Sheets (51) Int. Cl.
*B32B 15/01* (2006.01)
*C21D 6/00* (2006.01)
*C21D 8/12* (2006.01)
*C21D 9/46* (2006.01)
*C22C 38/00* (2006.01)
*C22C 38/02* (2006.01)
*C22C 38/04* (2006.01)
*C22C 38/06* (2006.01)
*C22C 38/12* (2006.01)
*C22C 38/14* (2006.01)
*C22C 38/60* (2006.01)
*H02K 15/02* (2006.01)

(52) U.S. Cl.
CPC ......... *C21D 8/1222* (2013.01); *C21D 8/1233* (2013.01); *C21D 8/1261* (2013.01); *C21D 9/46* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *H02K 15/02* (2013.01); *B32B 2307/732* (2013.01); *C22C 2202/02* (2013.01)

(58) Field of Classification Search
CPC ...... C21D 6/005; C21D 6/008; C21D 8/1222; C21D 8/1233; C21D 8/1261; C21D 9/46; C21D 1/30; C21D 1/76; C21D 8/1244; C21D 8/1272; C21D 1/74; C21D 8/0205; C21D 8/0221; C21D 8/0247; C22C 38/001; C22C 38/002; C22C 38/008; C22C 38/02; C22C 38/04; C22C 38/06; C22C 38/12; C22C 38/14; C22C 38/60; C22C 2202/02; C22C 38/005; C22C 38/08; C22C 38/10; C22C 38/16; C22C 38/34; C22C 38/004; Y02T 10/64; H01F 1/14783; H01F 1/16; H01F 1/147
See application file for complete search history.

(56) References Cited

U.S. PATENT DOCUMENTS

| | | |
|---|---|---|
| 2015/0357101 A1 | 12/2015 | Zaizen et al. |
| 2017/0314087 A1 | 11/2017 | Leunis et al. |
| 2018/0066333 A1 | 3/2018 | Nakajima et al. |
| 2019/0345576 A1 | 11/2019 | Park et al. |
| 2019/0382867 A1 | 12/2019 | Zaizen et al. |
| 2020/0010918 A1 | 1/2020 | Zaizen et al. |
| 2020/0017942 A1 | 1/2020 | Kubota et al. |
| 2020/0040423 A1 | 2/2020 | Natori et al. |
| 2020/0095659 A1 | 3/2020 | Kim et al. |
| 2020/0152363 A1 | 5/2020 | Kubota et al. |
| 2020/0232059 A1 | 6/2020 | Fujimura et al. |

FOREIGN PATENT DOCUMENTS

| | | |
|---|---|---|
| CN | 1827820 A | 9/2006 |
| CN | 1942597 A | 4/2007 |
| CN | 104937118 A | 9/2015 |
| CN | 107208230 A | 9/2017 |
| EP | 3904540 A1 | 11/2021 |
| EP | 3904551 A1 | 11/2021 |
| JP | 2004339537 A | 12/2004 |
| JP | 2005-264315 A | 9/2005 |
| JP | 2008050686 A | 3/2008 |
| JP | 2017088930 A | 5/2017 |
| JP | 2018021242 A | 2/2018 |
| JP | 6738056 B1 | 8/2020 |
| JP | 6744601 B1 | 8/2020 |
| KR | 10-2017-0072210 A | 6/2017 |
| TW | 201837200 A | 10/2018 |
| WO | 2018117597 A1 | 6/2018 |
| WO | 2018117640 A1 | 6/2018 |
| WO | 2018147044 A1 | 8/2018 |
| WO | 2018164185 A1 | 9/2018 |
| WO | 2018179871 A1 | 10/2018 |
| WO | 2018/220837 A1 | 12/2018 |
| WO | 2018220838 A1 | 12/2018 |
| WO | 2019017426 A1 | 1/2019 |

OTHER PUBLICATIONS

Japanese Office Action for Japanese Application No. 2020-549083, dated Oct. 19, 2020, with Concise Statement of Relevance of Office Action, 6 pages.
Taiwanese Office Action for Taiwanese Application No. 109121236, dated May 17, 2021, 8 pages.
Canadian Office Action for Canadian Application No. 3,137,623, dated Oct. 12, 2022, 3 pages.
Extended European Search Report for European Application No. 20 832 967.2, dated Jun. 20, 2022, 14 pages.
Chinese Office Action with Search Report for Chinese Application No. 202080045907.3, dated Dec. 27, 2022, 11 pages.
Office Action issued Jan. 3, 2024, by the Korean Intellectual Property Office in corresponding Korean Patent Application No. 10-2021-7040834 and an English translation of the Concise Statement of Relevance of Office Action. (7 pages).

* cited by examiner

METHOD FOR PRODUCING NON-ORIENTED ELECTRICAL STEEL SHEET, METHOD FOR PRODUCING MOTOR CORE, AND MOTOR CORE

CROSS REFERENCE TO RELATED APPLICATIONS

This is the U.S. National Phase application of PCT/JP2020/023366, filed Jun. 15, 2020, which claims priority to Japanese Patent Application No. 2019-120669, filed Jun. 28, 2019, the disclosures of these applications being incorporated herein by reference in their entireties for all purposes.

FIELD OF THE INVENTION

This invention relates to a method for producing a non-oriented electrical steel sheet, a method for producing a motor core by using the non-oriented electrical steel sheet, and a motor core made from the non-oriented electrical steel sheet.

BACKGROUND OF THE INVENTION

With the growing demand for energy saving in electric equipment in recent years, non-oriented electrical steel sheets used in an iron core of a rotary appliance (motor core) have been required to be excellent in magnetic properties. The motor core comprises a fixed stator core and a rotating rotor core. A HEV-driven motor or the like uses a high-frequency driving power source to satisfy the recent demand for smaller size and higher output power. Therefore, a non-oriented electrical steel sheet used in a stator core is strongly demanded to have excellent magnetic properties of high magnetic flux density and low iron loss at a high frequency.

The revolution number of the motor tends to be increased to achieve the smaller size and higher output power, so that a big centrifugal force is applied to the rotor core of a HEV-driven motor having a large outer diameter. Also, when the rotor core has a very narrow portion (1 to 2 mm) called as a bridge portion, a big load is applied to such a portion. Therefore, the non-oriented electrical steel sheet used in the rotor core is required to have a strength higher than the conventional ones.

The non-oriented electrical steel sheet used in a motor core is desired to be excellent in magnetic properties, and moreover, it is desired to have a high strength for use in the rotor core and a high magnetic flux density and low in iron loss at a high frequency for use in the stator core.

As mentioned above, the non-oriented electrical steel sheet is required to have different properties depending on for use in a rotor core and for use in a stator core, even when used for the same motor core. On the other hand, it is desirable to take out rotor core material and stator core material from the same raw steel sheet at the same time and thereafter assemble a rotor core or a stator core by laminating each core material, from the viewpoint of increasing the material yield and the like in the production of a motor core.

Patent Literature 1 discloses that a motor core is produced by taking out rotor core material and stator core material from the same raw steel sheet and laminating each material to assemble a rotor core and a stator core, and thereafter subjecting only the stator core to a stress-relief annealing. As the raw steel sheet, there is proposed a non-oriented electrical steel sheet having a sheet thickness of 0.15 to 0.35 mm, a yield strength before the stress-relief annealing of the steel sheet of not less than 600 MPa and an iron loss $W_{10/400}$ after the stress-relief annealing of not more than 20 W/kg.

PATENT LITERATURE

Patent Literature 1: JP-A-2008-50686

SUMMARY OF THE INVENTION

In the technique disclosed in Patent Literature 1, however, it is necessary to reduce impurity elements (Ti, S, N, V, Nb, Zr, As) contained in the raw steel sheet to a very low level to promote crystal grain growth in the stress-relief annealing. Also, this technique has a problem that a high production cost is caused by adding Ni, being high in the raw material cost, and conducting skin pass rolling before the stress-relief annealing in order to reduce the iron loss.

Aspects of the invention are made in consideration of the above problems and aims to propose a method for producing a non-oriented electrical steel sheet capable of producing a rotor core with high strength and a stator core with excellent magnetic properties after stress-relief annealing from the same raw material. Moreover, aspects of the invention aim to propose a method for producing a motor core by using the non-oriented electrical steel sheet and provide a motor core made from the non-oriented electrical steel sheet.

The inventors have made various studies focusing on an influence of the surface nature of a raw steel sheet material upon magnetic properties of a non-oriented electrical steel sheet in order to develop a non-oriented electrical steel sheet that can achieve high strength required for a rotor core as well as excellent magnetic properties after stress-relief annealing required for a stator core. As a result, it has been found out that the iron loss properties after the stress-relief annealing are largely improved by properly adjusting a ratio of an amount of nitrogen present as AlN (N as AlN) in a surface layer of the steel sheet after the stress-relief annealing to an amount of nitrogen present as AlN (N as AlN) in a full sheet thickness. Thus, the inventors have obtained a knowledge that it is important to suppress nitriding on the raw steel sheet surface in the stress relief annealing by controlling the Zn content in the raw steel sheet to a given range in order to properly adjust the above nitrogen amount ratio, whereby aspects of the invention have been accomplished.

Aspects of the invention based on the above knowledge include a method for producing a non-oriented electrical steel sheet by subjecting a steel slab having a component composition comprising C: not more than 0.0050 mass %, Si: 2.8 to 6.5 mass %, Mn: 0.05 to 2.0 mass %, P: not more than 0.10 mass %, S: not more than 0.0050 mass %, Al: 0.3 to 2 mass %, N: not more than 0.0050 mass %, Zn: 0.0005 to 0.0050 mass %, Ti: not more than 0.0030 mass %, Nb: not more than 0.0030 mass %, 0: not more than 0.0050 mass %, satisfying Si+Al≥4 mass % and the remainder being Fe and inevitable impurities to a hot rolling, a hot-band annealing, a cold rolling and a finish annealing, in which a yield stress of the steel sheet after the finish annealing is made to not less than 480 MPa.

The steel slab used in the method for producing a non-oriented electrical steel sheet according to aspects of the invention is characterized in that Zn and S contents satisfy the following equation (1):

$$0.20 \leq (Zn/65)/(S/32) \leq 0.90 \qquad (1).$$

Also, the method for producing a non-oriented electrical steel sheet according to aspects of the invention is characterized in that a soaking temperature in the finish annealing is in the range of 700 to 900° C.

Further, the steel slab used in the method for producing a non-oriented electrical steel sheet according to aspects of the invention is characterized by containing at least one group selected from the following groups A to D, in addition to the above component composition:

Group A: one or two selected from Sn: 0.005 to 0.20 mass % and Sb: 0.005 to 0.20 mass %;
Group B: one or more selected from Ca, Mg and REM by 0.0005 to 0.020 mass % in total;
Group C: one or more selected from Cr, Co, Ni and Cu by 0.01 to 1.0 mass % in total; and
Group D: one or two selected from Mo: 0.001 to 0.1 mass % and W: 0.001 to 0.1 mass %.

Furthermore, the steel slab used in the method for producing a non-oriented electrical steel sheet according to aspects of the invention is characterized by containing another optional element within a range that does not affect the strength and magnetic properties of the non-oriented electrical steel sheet, in addition to the above component composition.

Also, aspects of the invention include a method for producing a motor core comprising taking out rotor core material and stator core material at the same time from a non-oriented electrical steel sheet produced by any one of the aforementioned methods, laminating the rotor core material to form a rotor core, and laminating the stator core material followed by a stress-relief annealing to form a stator core, in which the steel sheet constituting the stator core is subjected to the stress-relief annealing so that $N_1$, $N_2$ and t satisfy the following equation (2):

$$(t \times N_2)/\{(t/10) \times N_1\} \geq 5.0 \qquad (2)$$

and that an iron loss $W_{10/400}$ (W/kg) satisfies the following equation (3) in relation to a sheet thickness t (mm):

$$W_{10/400} \leq 8 + 20 \times t \qquad (3),$$

where $N_1$ (mass %) is a content of nitrogen present as AlN (N as AlN) in a layer from a one-side surface to $\frac{1}{20}$ of a sheet thickness and $N_2$ (mass %) is a content of nitrogen present as AlN in a full sheet thickness (N as AlN) and t (mm) is a sheet thickness of the steel sheet.

The method for producing a motor core according to aspects of the invention is characterized in that a soaking temperature in the stress-relief annealing is in the range of 780 to 950° C., and an atmosphere in the stress-relief annealing is a mixed gas of one or two or more selected from nitrogen gas, hydrogen gas and a noble gas and has a nitrogen content of not more than 30 vol % and a dew point of not higher than −20° C.

Furthermore, aspects of the invention include a motor core configured with a rotor core made of a non-oriented electrical steel sheet having a component composition comprising C: not more than 0.0050 mass %, Si: 2.8 to 6.5 mass %, Mn: 0.05 to 2.0 mass %, P: not more than 0.10 mass %, S: not more than 0.0050 mass %, Al: 0.3 to 2 mass %, N: not more than 0.0050 mass %, Zn: 0.0005 to 0.0050 mass %, Ti: not more than 0.0030 mass %, Nb: not more than 0.0030 mass %, O: not more than 0.0050 mass %, satisfying Si+Al≥4 mass % and the remainder being Fe and inevitable impurities and a stator core made of the same non-oriented electrical steel sheet, in which the steel sheet constituting the rotor core has a yield stress of not less than 480 MPa;

$N_1$, $N_2$ and t of the steel sheet constituting the stator core satisfy the following equation (2):

$$(t \times N_2)/\{(t/10) \times N_1\} \geq 5.0 \qquad (2),$$

where $N_1$ (mass %) is a content of nitrogen present as AlN (N as AlN) in a layer from a one-side surface to $\frac{1}{20}$ of a sheet thickness and $N_2$ (mass %) is a content of nitrogen present as AlN in a full sheet thickness (N as AlN) and t (mm) is a sheet thickness of the steel sheet; and an iron loss $W_{10/400}$ (W/kg) satisfies the following equation (3) in relation to the sheet thickness t (mm):

$$W_{10/400} \leq 8 + 20 \times t \qquad (3).$$

The non-oriented electrical steel sheet as a raw material of a motor core according to aspects of the invention is characterized in that Zn and S contents satisfy the following equation (1):

$$0.20 \leq (Zn/65)/(S/32) \leq 0.90 \qquad (1).$$

Furthermore, the non-oriented electrical steel sheet as a raw material of a motor core according to aspects of the invention is characterized by containing at least one group selected from following Groups A to D, in addition to the above component composition:

Group A: one or two selected from Sn: 0.005 to 0.20 mass % and Sb: 0.005 to 0.20 mass %;
Group B: one or more selected from Ca, Mg and REM by 0.0005 to 0.020 mass % in total;
Group C: one or more selected from Cr, Co, Ni and Cu by 0.01 to 1.0 mass % in total; and
Group D: one or two selected from Mo: 0.001 to 0.1 mass % and W: 0.001 to 0.1 mass %.

Also, the non-oriented electrical steel sheet as a raw material of a motor core according to aspects of the invention is characterized by containing another optional element within a range that does not affect the strength and magnetic properties of the non-oriented electrical steel sheet, in addition to the above component composition.

Aspects of the invention can produce a non-oriented electrical steel sheet being high in strength after finish annealing as well as low in iron loss after stress-relief annealing, whereby it is possible to produce a rotor core that requires high strength and a stator core that requires low iron loss from the same raw steel material sheet. Accordingly, it is possible to stably provide a motor core for hybrid electric car, electric car, cleaner, high-speed generator, compressor for air conditioner, machine tool and the like.

DETAILED DESCRIPTION OF EMBODIMENTS OF THE INVENTION

An explanation will be made on experiments that have led to aspects of the invention below.

At first, a finish-annealed steel sheet to be subjected to the measurement of mechanical properties and magnetic properties is produced by the following steps:

1. Continuous casting step in which 11 charges of steel having the following component composition are melted in a vacuum melting furnace and casted to form a raw steel material;

(Component Composition of Steel)

C: 0.0025 mass %, Si: 3.5 mass %, Mn: 0.7 mass %, P: 0.01 mass %, S: 0.0021 mass %, Al: 0.9 mass %, N: 0.0019 mass %, Ti: 0.0011 mass %, Nb: 0.0009 mass %, O: 0.0024 mass % and the remainder being Fe and inevitable impurities 2. Hot rolling step in which the raw steel material is hot rolled to form a hot-rolled sheet having a sheet thickness of 2.0 mm;
3. Hot-band annealing step in which the hot-rolled sheet is annealed at 930° C. for 30 seconds;
4. Pickling step in which the hot-rolled sheet is pickled after hot-band annealing;
5. Cold rolling step in which the hot-rolled sheet after the pickling is formed into a cold-rolled sheet having a sheet thickness of 0.25 mm;
6. Finish annealing step in which the cold-rolled sheet is subjected to a finish annealing in an atmosphere of $H_2:N_2=20:80$ by vol % at 800° C. for 10 seconds.

A JIS No. 5 tensile test specimen having a tensile direction in the rolling direction is taken out from the steel sheet after the finish annealing and subjected to a tensile test according to JIS Z 2241 to measure an upper yield point. Moreover, other test specimens with a length of 180 mm and a width of 30 mm are cut out from both the rolling direction (L-direction) and the direction perpendicular to the rolling direction (C-direction) of the steel sheet after the finish annealing and subjected to a heat treatment simulating stress-relief annealing at 850° C. for 1 hour in an atmosphere of $N_2=100$ vol %, and an iron loss $W_{10/400}$ thereof in (L+C directions) is measured by an Epstein test.

The result shows that there are variations in the measurement values of the iron loss. In order to examine the cause thereof, trace components in each raw steel material (slab) are analyzed, and as a result it has been confirmed that Zn is contained in the range of 0.0001 to 0.01 mass %.

Figure 1:
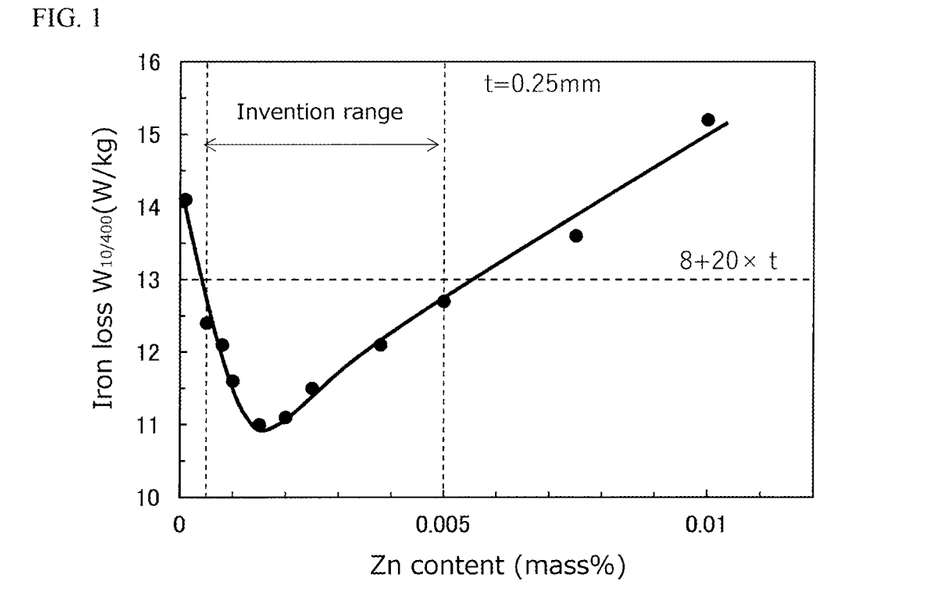
FIG. 1 is a graph showing an influence of a Zn content upon an iron loss $W_{10/400}$ after stress-relief annealing.

Table 1 shows a relation between a Zn content and an iron loss $W_{10/400}$ in the raw steel material, and FIG. 1 is a drawing showing the relation. As shown in Table 1 and FIG. 1, the iron loss is confirmed to be reduced when the Zn content is in the range of 0.0005 to 0.005 mass %. In order to study the cause of reduction of the iron loss, a section of the steel sheet after the finish annealing is observed by SEM. As a result, precipitation of fine MN is confirmed within 1/20 of the sheet thickness from the steel sheet surface of the test specimens where iron loss has increased, and thus it is presumed that the precipitation of the fine nitride has increased the iron loss.

TABLE 1

| Zn content (mass %) | Iron loss $W_{10/400}$ (W/kg) |
| --- | --- |
| 0.0001 | 14.1 |
| 0.0005 | 12.4 |
| 0.0008 | 12.1 |
| 0.0010 | 11.6 |
| 0.0015 | 11.0 |
| 0.0020 | 11.1 |
| 0.0025 | 11.5 |
| 0.0038 | 12.1 |
| 0.0050 | 12.7 |
| 0.0075 | 13.6 |
| 0.0100 | 15.2 |

Figure 2:
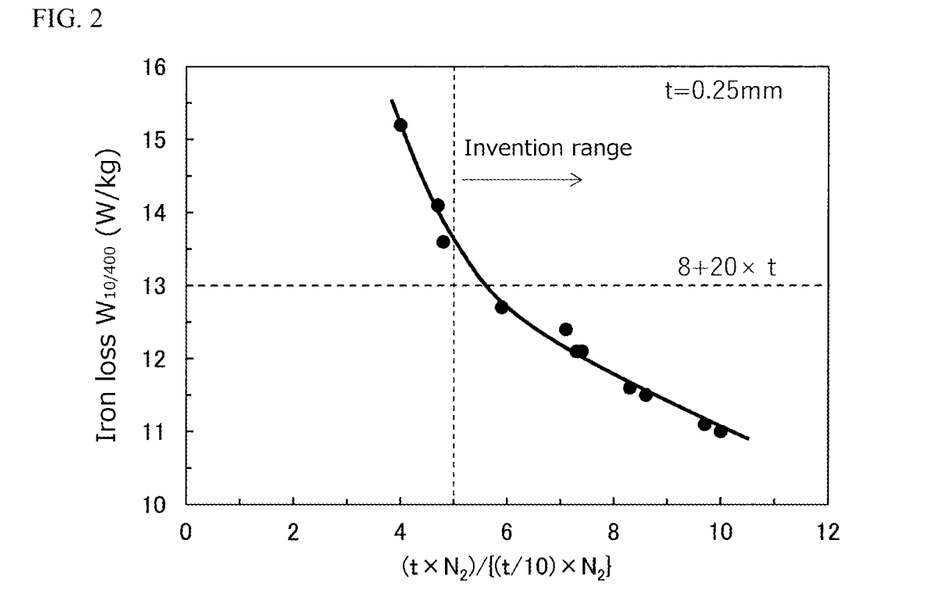
FIG. 2 is a graph showing an influence of a ratio of the nitrogen amount present as MN in a surface layer and the nitrogen amount in a full sheet thickness of a steel sheet after stress-relief annealing upon an iron loss $W_{10/400}$ after stress-relief annealing.

The above steel sheet after the stress-relief annealing is subjected to an electrolytic extraction method to analyze the content $N_1$ (mass %) of N present as MN in a layer within 1/20 of the sheet thickness from the one-side surface of the steel sheet and the content $N_2$ (mass %) of N present as MN in the full sheet thickness of the steel sheet. Table 2 shows the relation of the analyzed results and the iron loss. FIG. 2 is a drawing showing Table 2. As seen from Table 2 and FIG. 2, the iron loss is more reduced as the value of $(t \times N_2)/\{(t/10) \times N_1\}$ being the ratio of the nitrogen amount present as MN in the full sheet thickness of the steel sheet with respect to the nitrogen amount present as MN in the layer within 1/20 of the sheet thickness from the one-side surface of the steel sheet becomes larger, that is, as the nitriding degree in the surface layer of the steel sheet is larger.

TABLE 2

| $(t \times N_2)/\{(t/10) \times N_1\}$ | Iron loss $W_{10/400}$ (W/kg) |
| --- | --- |
| 4.0 | 15.2 |
| 4.7 | 14.1 |
| 4.8 | 13.6 |
| 5.9 | 12.7 |
| 7.1 | 12.4 |
| 7.3 | 12.1 |
| 7.4 | 12.1 |
| 8.3 | 11.6 |
| 8.6 | 11.5 |
| 9.7 | 11.1 |
| 10.0 | 11.0 |

From the above results, the reason for the reduction of the iron loss confirmed when the Zn content is in the range of 0.0005 to 0.0050 mass % is considered due to the fact that zinc-based oxide is formed on the steel sheet surface by the trace addition of zinc thus to suppress nitriding in the stress-relief annealing. Moreover, the reason why the iron loss is rather increased as the Zn content is more increased is considered due to the fact that sulfide of Zn is formed and precipitated to increase the iron loss.

Figure 3:
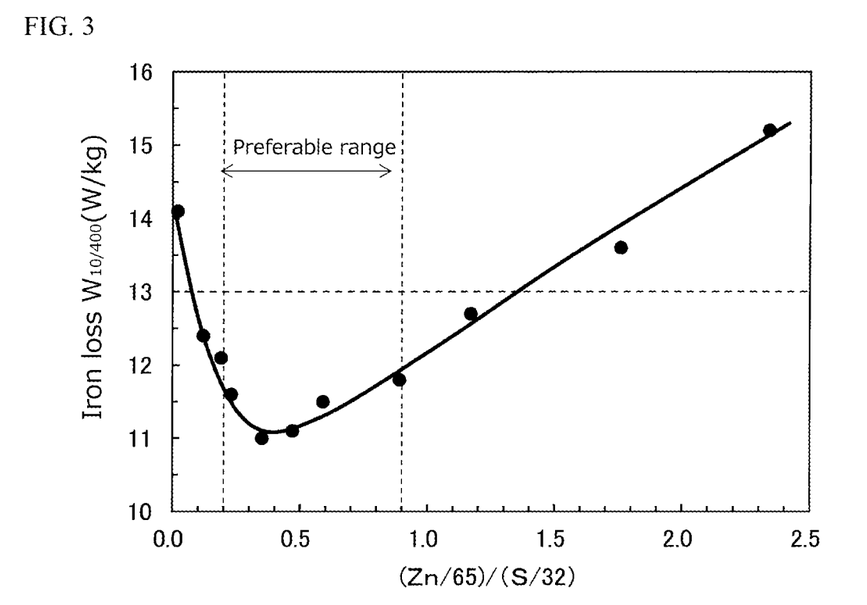
FIG. 3 is a graph showing an influence of an atomic ratio of Zn and S $\{(Zn/65)/(S/32)\}$ upon an iron loss $W_{10/400}$ after stress-relief annealing.

As mentioned above, the low iron loss can be sufficiently achieved when the Zn content is within the range of 0.0005 to 0.0050 mass %. As shown in FIGS. 1 and 2, however, there are differences even among the low iron loss values, and in order to identify the cause of the differences, a ratio of Zn to other trace elements has been investigated. As seen from Table 3 and FIG. 3 being a drawing of Table 3, the result shows that the lower iron loss is achieved when the Zn and S contents are within a given range.

Concretely, it is preferable that an atomic ratio of Zn to S, or (Zn/65)/(S/32) satisfies the following equation (1):

$$0.20 \leq (Zn/65)/(S/32) \leq 0.90 \quad (1).$$

It is supposedly due to the fact that it is difficult to obtain the effect of suppressing nitriding by Zn in the case of 0.20>(Zn/65)/(S/32), as compared to the case that the ratio is within the above range, while the precipitation amount of ZnS increases to rather increase the iron loss in the case of (Zn/65)/(S/32)>0.90.

TABLE 3

| (Zn/65)/(S/32) | Iron loss $W_{10/400}$ (W/kg) |
|---|---|
| 0.12 | 12.4 |
| 0.19 | 12.1 |
| 0.23 | 11.6 |
| 0.35 | 11.0 |
| 0.47 | 11.1 |
| 0.59 | 11.5 |
| 0.89 | 11.8 |
| 1.17 | 12.7 |

An examination is made on the influence of an atmosphere, which is considered to largely affect the nitriding in the surface layer of the steel sheet in the stress-relief annealing. In this examination, a finish-annealed steel sheet to be subjected to the measurement of mechanical properties and magnetic properties is produced by the following steps:
1. Continuous casting step in which 7 charges of steel having the following component composition are melted in a vacuum melting furnace and casted to form a raw steel material;
(Component Composition of Steel)
C: 0.0026 mass %, Si: 3.6 mass %, Mn: 0.5 mass %, P: 0.01 mass %, S: 0.0017 mass %, Al: 1.0 mass %, N: 0.0021 mass %, Ti: 0.0013 mass %, Nb: 0.0009 mass %, O: 0.0022 mass %, Zn: 0.0019 mass % and the remainder being Fe and inevitable impurities
2. Hot rolling step in which the raw steel material is hot rolled to form a hot-rolled sheet having a sheet thickness of 1.8 mm;
3. Hot-band annealing step in which the hot-rolled sheet is annealed at 920° C. for 30 seconds;
4. Pickling step in which the hot-rolled sheet is pickled after the hot-band annealing;
5. Cold rolling step in which the hot-rolled sheet after the pickling is formed into a cold-rolled sheet having a sheet thickness of 0.30 mm;
6. Finish annealing step in which the cold-rolled sheet is subjected to a finish annealing in an atmosphere of $H_2:N_2=20:80$ by vol % at 790° C. for 10 seconds.

A JIS No. 5 tensile test specimen having a tensile direction in the rolling direction is taken out from the steel sheet after the finish annealing to thus measure an upper yield point thereof by a tensile test according to JIS Z 2241, and a value of 560 MPa is obtained. Then, test specimens with a length of 180 mm and a width of 30 mm are cut out both from the rolling direction (L-direction) and the direction perpendicular to the rolling direction (C-direction) of the finish-annealed steel sheet and subjected to a heat treatment simulating a stress-relief annealing in a mixed atmosphere of hydrogen and nitrogen at 825° C. for 1 hour to measure values of iron loss $W_{10/400}$ in (L+C) directions by an Epstein test. In this case, an experiment is conducted by varying a nitrogen partial pressure within the range of 0 to 100 vol % with the dew point (dp) of the mixed atmosphere in the stress-relief annealing of −50° C. (constant), and also another experiment is conducted by varying a dew point within the range of −60 to 30° C. at a nitrogen partial pressure of 20 vol % (constant) during the stress relief annealing.

Figure 4:
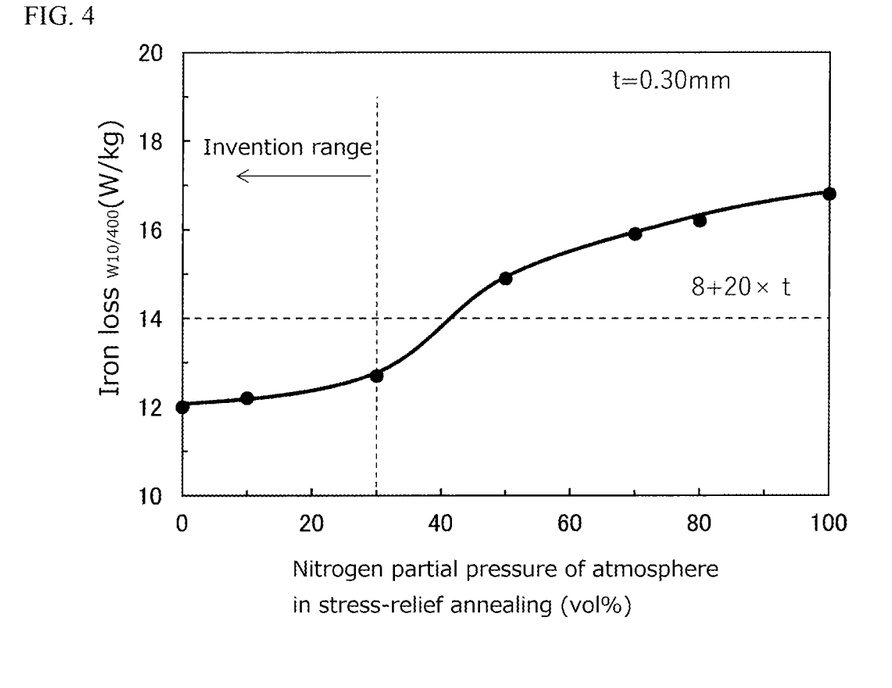
FIG. 4 is a graph showing an influence of a nitrogen partial pressure upon an iron loss $W_{10/400}$ after stress-relief annealing.

Table 4 shows a relation between the nitrogen partial pressure of the atmosphere in the stress-relief annealing and the iron loss after the stress-relief annealing. Also, FIG. 4 is a drawing of Table 4. Table 4 and FIG. 4 show that the excellent iron loss properties can be obtained when the nitrogen partial pressure of the atmosphere in the stress-relief annealing is reduced to not more than 30 vol %. This is considered due to the fact that nitriding in the surface layer of the steel sheet is suppressed by reducing the nitrogen partial pressure of the atmosphere in the stress-relief annealing to not more than 30 vol %.

TABLE 4

| Nitrogen partial pressure of atmosphere in stress-relief annealing (vol %) | Iron loss $W_{10/400}$ (W/kg) |
|---|---|
| 100 | 16.8 |
| 80 | 16.2 |
| 70 | 15.9 |
| 50 | 14.9 |
| 30 | 12.7 |
| 10 | 12.2 |
| 0 | 12.0 |

Figure 5:
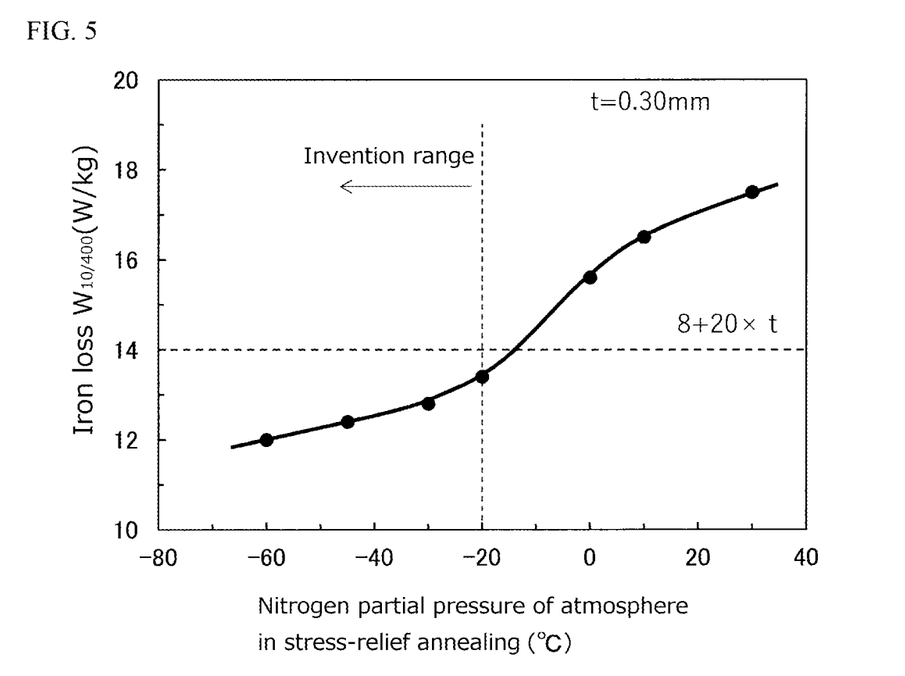
FIG. 5 is a graph showing of a dew point of an atmosphere in stress-relief annealing upon an iron loss $W_{10/400}$ after stress-relief annealing.

Table 5 shows a relation between the dew point of the atmosphere in the stress-relief annealing and the iron loss after the stress-relief annealing. FIG. 5 is a drawing of Table 5. As seen from Table 5 and FIG. 5, excellent iron loss properties are obtained when the dew point of the atmosphere in the stress-relief annealing is set to not higher than −20° C. This is considered due to the fact that the formation of a layer of oxide such as $Al_2O_3$ and the like is suppressed on the steel sheet surface and the increase of hysteresis loss is suppressed by setting the dew point of the atmosphere in the stress-relief annealing to not higher than −20° C.

Aspects of the invention are accomplished by performing further examinations based on the above knowledge.

TABLE 5

| Dew point of an atmosphere in stress-relief annealing (° C.) | Iron loss $W_{10/400}$ (W/kg) |
|---|---|
| −60 | 12.0 |
| −45 | 12.4 |
| −30 | 12.8 |
| −20 | 13.4 |
| 0 | 15.6 |
| 10 | 16.5 |
| 30 | 17.5 |

An explanation will be made on the reason for limiting the component composition of a non-oriented electrical steel sheet according to aspects of the invention below.

C: not more than 0.0050 mass %

C is a harmful element which forms a carbide to cause magnetic aging and thus deteriorate iron loss properties of a product sheet. Therefore, it is necessary to limit an upper limit of C contained in a raw steel material to 0.0050 mass %, preferably to not more than 0.0040 mass %. Moreover, the lower limit of C is not particularly defined, but is preferable to be about 0.0001 mass % from a viewpoint of suppressing decarburization cost in the steelmaking.

Si: 2.8 to 6.5 mass %

Si has not only an effect of increasing a specific resistance of steel to reduce an iron loss but also an effect of increasing a strength of steel by solid-solution strengthening, and hence it is contained by not less than 2.8 mass %. On the other hand, the Si content exceeding 6.5 mass % makes the rolling difficult, so that the upper limit is 6.5 mass %. Preferably, Si is in the range of 3.0 to 6.0 mass %.

Mn: 0.05 to 2.0 mass %

Mn is an element useful for increasing the specific resistance and strength of steel, like Si. Also, Mn forms a sulfide to thus fix S and improves hot brittleness, and hence Mn is contained by not less than 0.05 mass %. On the other hand, the addition exceeding 2.0 mass % causes slab cracking and the like and deteriorates the operability in the steel-making, and accordingly, the upper limit is set to 2.0 mass %. Preferably, Mn is in the range of 0.1 to 1.5 mass %.

P: not more than 0.10 mass %

P is an element which increases the specific resistance and has a significant effect of reducing eddy current loss. As being excellent in the solid-solution strengthening ability, P can be properly added. However, the excessive addition of P causes the deterioration of the cold rolling property, so that the upper limit is 0.10 mass %, preferably not more than 0.05 mass %.

S: not more than 0.0050 mass %

S is formed into sulfide to form precipitates and/or inclusion and deteriorate productivity (hot-rolling property) and magnetic properties of a product sheet, so that it is preferable to decrease Si as much as possible. Hence, the upper limit of S is 0.0050 mass %, more preferably not more than 0.0030 mass %.

Al: 0.3 to 2 mass %

Al has an effect of increasing the specific resistance of steel and reduce the iron loss, like Si. However, when Al is less than 0.3 mass %, fine nitride is formed and precipitated to deteriorate the iron loss properties, so that the lower limit is 0.3 mass %. On the other hand, when the Al content exceeds 2 mass %, steel is embrittled and the rolling is difficult, so that the upper limit is 2 mass %. Preferably, Al is in the range of 0.4 to 1.5 mass %.

N: not more than 0.0050 mass %

N is an element that forms a nitride and is precipitated to deteriorate the magnetic properties, so that the N content is limited to not more than 0.0050 mass %, preferably to not more than 0.0040 mass %.

Zn: 0.0005 to 0.0050 mass %

Zn is one of the most important components in accordance with aspects of the invention and has an effect of suppressing nitriding on the steel sheet surface in the stress-relief annealing. Accordingly, Zn is added by not less than 0.0005 mass %. On the other hand, when Zn is added by more than 0.0050 mass %, sulfide is formed and precipitated, rather causing an increase in the iron loss. Therefore, the Zn content is limited to not more than 0.0050 mass. Preferably Zn is in the range of 0.001 to 0.004 mass %.

Ti: not more than 0.0030 mass %, Nb: not more than 0.0030 mass %

Ti and Nb are elements that form fine precipitates to be precipitated and increase the iron loss. In particular, when each content exceeds 0.0030 mass %, the above bad influence becomes remarkable, so that each content of Ti and Nb is limited to not more than 0.0030 mass %, preferably not more than 0.0020 mass %.

O: not more than 0.0050 mass %

O is an element that forms oxide to deteriorate the magnetic properties, and thus the O content is limited to not more than 0.0050 mass %, preferably not more than 0.0040 mass %.

The non-oriented electrical steel sheet according to aspects of the invention is preferable to have an atomic ratio of Zn to S, i.e. (Zn/65)/(S/32) satisfying the following equation (1), in addition to the above component composition:

$$0.20 \leq (Zn/65)/(S/32) \leq 0.90 \tag{1}.$$

The atomic ratio of Zn to S satisfying the above equation (1) allows the effect of suppressing nitriding of Zn to be developed remarkably.

The remainder other than the above components in the non-oriented electrical steel sheet according to aspects of the invention is Fe and inevitable impurities. However, the following elements may be contained in addition to the aforementioned components.

Sn: 0.005 to 0.20 mass %, Sb: 0.005 to 0.20 mass %

Sn and Sb have an effect of improving recrystallization texture to improve the magnetic flux density and iron loss. In order to obtain the above effect, it is preferable to add each element by not less than 0.005 mass %. However, the addition exceeding 0.20 mass % causes the above effect to be saturated. Therefore, it is preferable to add one or two of Sn and Sb in the range of 0.005 to 0.20 mass % each, more preferably 0.01 to 0.1 mass % each.

Ca: 0.0005 to 0.020 mass %, Mg: 0.0005 to 0.020 mass % and REM: 0.0005 to 0.020 mass %

Ca, Mg, and REM have an effect of forming stable sulfide and improving the grain growth properties in stress-relief annealing. In order to obtain the above effect, it is preferable to add one or more selected from these elements by not less than 0.0005 mass % in total. On the other hand, the total addition exceeding 0.020 mass % only causes the above effect to be saturated. When one or more of the elements are added, therefore, the total content is preferable to fall within the range of 0.0005 to 0.020 mass %. More preferably, it is in the range of 0.001 to 0.008 mass %.

Cr: 0.01 to 1.0 mass %, Co: 0.01 to 1.0 mass %, Ni: 0.01 to 1.0 mass % and Cu: 0.01 to 1.0 mass %

Cr, Co, Ni, and Cu have an effect of increasing specific resistance of steel to reduce the iron loss and increase the strength of steel. In order to obtain the above effect, it is preferable to add one or more selected from Cu, Co, Ni, and Cr by not less than 0.01 mass % in total. However, the addition exceeding 1.0 mass % brings about the increase in costs. Therefore, these elements are preferable to be added by 0.01 to 1.0 mass % in total, more preferably by 0.1 to 0.5 mass % in total.

Mo: 0.001 to 0.1 mass % and W: 0.001 to 0.1 mass %

Mo and W are elements both effective for suppressing defect (scab) of the steel sheet surface. In particular, the steel sheet according to aspects of the invention, being a high alloy steel and easily oxidized, tends to cause scab resulting from surface cracking, at a high incidence rate. However, the cracking can be suppressed by adding a trace amount of Mo and W which are elements that increase the high-temperature strength. Such an effect is not sufficient when each content of Mo and W is less than 0.0010 mass %, while the above effect is saturated when it exceeds 0.1 mass %, only leading to increase in alloying costs. When Mo and W are added, therefore, each content is preferable to be in the above range. More preferably, each content is in the range of 0.0050 to 0.050 mass %.

Also, the non-oriented electrical steel sheet according to aspects of the invention may contain an element other than the aforementioned components in the range that has no bad influence on the strength properties and magnetic properties of the non-oriented electrical steel sheet. The term "has no bad influence on the strength properties" means that the yield stress after the finish annealing is not less than 480 MPa when the respective elements are contained. Also, the term "have no bad influence on the magnetic properties" means that the iron loss $W_{10/400}$ (W/kg) is not less than a standard value, which is calculated by the following equation (3), when the respective elements are contained. The components other than the aforementioned ones include not more than 0.10 mass % As, not more than 0.10 mass % Bi and so on.

An explanation will be made on a method for producing a non-oriented electrical steel sheet according to aspects of the invention.

A production of a non-oriented electrical steel sheet according to aspects of the invention comprises a series of steps comprising a production step of the aforementioned raw steel material, a hot rolling step, a hot-band annealing step, a pickling step, a cold rolling step and a finish annealing step. Each step will be concretely explained below.

<Production Step of Raw Steel Material>

A raw steel material (slab) used in the production of a non-oriented electrical steel sheet according to aspects of the invention can be produced by melting a steel having the aforementioned component composition conforming to aspects of the invention by a well-known refining process using a converter, an electric furnace, a vacuum degassing device or the like and then performing a usual procedure of a continuous casting method or an ingot making-blooming method. Moreover, a thin slab having a thickness of not more than 100 mm may be produced by a direct casting method.

<Hot Rolling Step>

Then, the steel slab is usually hot rolled by a well-known process under well-known conditions to form a hot-rolled sheet. Moreover, the steel slab is usually reheated to a given temperature in a heating furnace and then subjected to the hot rolling, but may be subjected to the hot rolling immediately after the casting without reheating. In the case of using the thin slab, it may be hot rolled or may proceed to subsequent step without hot rolling.

<Hot-Band Annealing Step>

A hot-band annealing subsequent to the hot rolling is preferable to be performed at a soaking temperature in the range of 800 to 1100° C. The effect of the hot-band annealing is small when the soaking temperature is lower than 800° C., while, when it exceeds 1100° C., crystal grains are coarsened to promote brittle fracture (sheet breakage) in cold rolling or become disadvantageous to the production costs. The soaking time is preferable to be not more than 180 seconds from a viewpoint of ensuring productivity. It is more preferable that the soaking temperature is 850 to 1000° C. and the soaking time is not more than 60 seconds.

<Cold Rolling Step>

Next, the steel sheet after the hot-band annealing is pickled for descaling and thereafter subjected to a single cold rolling or two or more cold rollings having an intermediate annealing between each cold rolling to form a cold-rolled sheet having a final sheet thickness. The finish thickness in the cold rolling (final sheet thickness) is not particularly limited, but is preferable to be in the range of 0.1 to 0.35 mm. The productivity lowers when the sheet thickness is less than 0.1 mm, while the effect of reducing the iron loss is small when the sheet thickness exceeds 0.35 mm.

<Finish Annealing Step>

The cold-rolled sheet having the final sheet thickness is then subjected to a finish annealing. The finish annealing is preferably a continuous annealing to be performed at a preferable soaking temperature of 700 to 900° C. for a soaking temperature holding time of 1 to 300 seconds. When the soaking temperature is lower than 700° C. and the soaking time is less than 1 second, recrystallization is not advanced sufficiently, failing to obtain not only good magnetic properties but also a sufficient effect of the shape correction in the continuous annealing. On the other hand, when the soaking temperature exceeds 900° C. and the soaking time exceeds 300 seconds, the crystal grain size is coarsened to decrease the strength of the steel sheet. From a viewpoint of securing the strength after the finish annealing required for a rotor core (yield stress: not less than 480 MPa), it is desirable that the finish annealing is performed at a low temperature for a short time as much as possible within the extent the shape correction can be conducted. More preferably, the soaking temperature is in the range of 750 to 850° C. and the soaking time is in the range of 1 to 30 seconds.

The steel sheet after the finish annealing has a property that the yield stress in the tensile test (upper yield point) is not less than 480 MPa. As mentioned later, when the stress-relief annealing is conducted under conditions conforming to aspects of the present invention, the steel sheet has a feature that the iron loss properties are very excellent.

In order to secure the insulation property in the lamination of the steel sheets, it is preferable to form an insulation coating on the surface of the steel sheet after the finish annealing and provide a product sheet (non-oriented electrical steel sheet). The insulation coating is desirably an organic coating containing a resin to secure a good punchability, while it is desirably a semi-organic coating or an inorganic coating when the weldability is considered important.

An explanation will be made on a motor core according to aspects of the invention and a method for producing the same below.

The motor core according to aspects of the invention uses the steel sheet after the finish annealing obtained as above as a raw material, and a rotor core material and a stator core material of a core form are taken out from the steel sheet as a raw material by punching or the like at the same time. Thereafter, the rotor core material is laminated and fixed to assemble a rotor core, and the stator core material is laminated and fixed to assemble a stator core.

The rotor core which is required to have a high strength is used in the motor core as it is, while the stator core which is required to have excellent magnetic properties is further subjected to a stress-relief annealing to improve the magnetic properties and then used in the motor core. This stress-relief annealing is a very important step in accordance with aspects of the invention and is preferable to be conducted under conditions at 780 to 950° C. for 0.1 to 10 hours. When the stress-relief annealing temperature is lower than 780° C. and the annealing time is less than 0.1 hour, the effect of reducing the iron loss is small. On the other hand, when the annealing temperature exceeds 950° C. and the annealing time exceeds 10 hours, it is difficult to secure insulation among the laminated steel sheets, and the productivity is hindered.

The atmosphere in the stress-relief annealing is also very important and is an inert gas atmosphere from a viewpoint of suppressing the nitriding of the surface layer of the steel sheet. Concretely, it is a mixed gas of one or more selected from $N_2$, $H_2$ and a noble gas, and a $N_2$ content in the atmosphere gas is preferable to be not more than 30 vol %. For example, an atmosphere of $H_2:N_2=80:20$ as a vol % ratio is preferable. Also, the dew point of the atmosphere is preferably not higher than −20° C., more preferably not higher than −40° C. from a viewpoint of preventing oxidation on the steel sheet surface to reduce the iron loss. Moreover, the atmosphere in the stress-relief annealing is preferable to be controlled at a temperature zone of not lower than 600° C. in the heating, soaking and cooling.

The steel sheet subjected to the stress-relief annealing under the above conditions, that is, the steel sheet configuring the stator core satisfies the following equation (2):

$$(t \times N_2)/\{(t/10) \times N_1\} \geq 5.0 \quad (2),$$

where $N_1$ (mass %) is a content of nitrogen present as AlN (N as AlN) in a layer from a one-side surface to 1/20 of a sheet thickness and $N_2$ (mass %) is a content of nitrogen present as AlN in a full sheet thickness (N as AlN) and t (mm) is a sheet thickness of the steel sheet.

The equation (2) can be attained by controlling the Zn content in the raw material steel sheet to a range of 0.0005 to 0.0050 mass % together with controlling the nitrogen partial pressure and the dew point of the atmosphere in the stress-relief annealing to not more than 30 vol % and not higher than −20° C., respectively, to suppress the nitriding in the surface layer of the steel sheet and oxidation on the steel sheet surface.

In the steel sheet that satisfies the equation (2), hysteresis loss can be largely decreased by suppressing nitriding in the surface layer of the steel sheet and the oxidation on the steel sheet surface in the stress-relief annealing, and thus the iron loss $W_{10/400}$ (W/kg) of the steel sheet after the stress-relief annealing satisfies the following equation (3) in relation to the sheet thickness t (mm):

$$W_{10/400} \leq 8 + 20 \times t \quad (3).$$

When the equation (3) is not satisfied, the heat generation of the stator core increases to considerably lower the efficiency of the motor lowers.

EXAMPLES

Each raw steel material (slab) having various component compositions shown in Table 6 is heated to a temperature of 1120° C. for 30 minutes and thereafter hot rolled to form a hot-rolled sheet having a sheet thickness of 1.9 mm. The hot-rolled sheet is subjected to a hot-band annealing at 925° C. for 30 seconds, pickled for descaling and cold rolled to form a cold-rolled sheet having a final sheet thickness shown in Table 7. Then, the cold-rolled sheet is subjected to a finish annealing under various conditions shown in Table 7 to obtain a finish-annealed sheet.

TABLE 6

| Steel No | Component composition (mass %) | | | | | | | | | | | |
|---|---|---|---|---|---|---|---|---|---|---|---|---|
| | C | Si | Mn | P | S | Al | Zn | Ti | Nb | O | N | Sn, Sb |
| 1 | 0.0025 | 3.6 | 0.4 | 0.01 | 0.0018 | 0.8 | 0.0021 | 0.0011 | 0.0009 | 0.0024 | 0.0027 | Sn: 0.03 |
| 2 | 0.0025 | 3.6 | 0.4 | 0.01 | 0.0018 | 0.8 | 0.0021 | 0.0011 | 0.0009 | 0.0024 | 0.0027 | Sn: 0.03 |
| 3 | 0.0025 | 3.6 | 0.4 | 0.01 | 0.0018 | 0.8 | 0.0021 | 0.0011 | 0.0009 | 0.0024 | 0.0027 | Sn: 0.03 |
| 4 | 0.0025 | 3.6 | 0.4 | 0.01 | 0.0018 | 0.8 | 0.0021 | 0.0011 | 0.0009 | 0.0024 | 0.0027 | Sn: 0.03 |
| 5 | 0.0025 | 3.6 | 0.4 | 0.01 | 0.0018 | 0.8 | 0.0003 | 0.0011 | 0.0009 | 0.0024 | 0.0027 | Sn: 0.03 |
| 6 | 0.0025 | 3.8 | 0.5 | 0.01 | 0.0019 | 0.6 | 0.0029 | 0.0013 | 0.0011 | 0.0025 | 0.0024 | — |
| 7 | 0.0021 | 3.8 | 0.5 | 0.01 | 0.0019 | 0.6 | 0.0029 | 0.0013 | 0.0011 | 0.0025 | 0.0024 | — |
| 8 | 0.0021 | 3.8 | 0.5 | 0.01 | 0.0019 | 0.6 | 0.0029 | 0.0013 | 0.0011 | 0.0025 | 0.0024 | — |
| 9 | 0.0021 | 3.8 | 0.5 | 0.01 | 0.0019 | 0.6 | 0.0029 | 0.0013 | 0.0011 | 0.0025 | 0.0024 | — |
| 10 | 0.0021 | 3.8 | 0.5 | 0.01 | 0.0019 | 0.6 | 0.0029 | 0.0013 | 0.0011 | 0.0025 | 0.0024 | — |
| 11 | 0.0021 | 3.8 | 0.5 | 0.01 | 0.0019 | 0.6 | 0.0029 | 0.0013 | 0.0011 | 0.0025 | 0.0024 | — |
| 12 | 0.0028 | 3.2 | 0.8 | 0.01 | 0.0024 | 1.2 | 0.0024 | 0.0008 | 0.0012 | 0.0021 | 0.0019 | Sn: 0.04 |
| 13 | 0.0028 | 3.2 | 0.8 | 0.01 | 0.0024 | 1.8 | 0.0024 | 0.0008 | 0.0012 | 0.0021 | 0.0020 | Sn: 0.04 |
| 14 | 0.0029 | 3.5 | 2.5 | 0.01 | 0.0024 | 0.5 | 0.0021 | 0.0008 | 0.0011 | 0.0021 | 0.0028 | — |
| 15 | 0.0025 | 3.3 | 0.1 | 0.01 | 0.0024 | 2.5 | 0.0015 | 0.0008 | 0.0011 | 0.0021 | 0.0021 | — |
| 16 | 0.0019 | 4.2 | 0.3 | 0.01 | 0.0015 | 0.3 | 0.0026 | 0.0014 | 0.0012 | 0.0019 | 0.0027 | Sb: 0.01 |
| 17 | 0.0019 | 5.6 | 0.3 | 0.01 | 0.0015 | 0.3 | 0.0027 | 0.0014 | 0.0012 | 0.0019 | 0.0027 | — |
| 18 | 0.0022 | 7.2 | 0.2 | 0.01 | 0.0024 | 0.3 | 0.0038 | 0.0008 | 0.0011 | 0.0021 | 0.0028 | — |
| 19 | 0.0021 | 4.0 | 0.4 | 0.01 | 0.0026 | 0.6 | 0.0032 | 0.0011 | 0.0013 | 0.0028 | 0.0024 | Sn: 0.03 |
| 20 | 0.0021 | 4.1 | 0.4 | 0.01 | 0.0026 | 0.6 | 0.0032 | 0.0011 | 0.0013 | 0.0028 | 0.0024 | Sn: 0.03 |
| 21 | 0.0026 | 3.2 | 0.1 | 0.25 | 0.0026 | 1.5 | 0.0025 | 0.0011 | 0.0013 | 0.0028 | 0.0024 | Sn: 0.06 |
| 22 | 0.0024 | 3.4 | 1.2 | 0.01 | 0.0019 | 0.9 | 0.0024 | 0.0016 | 0.0014 | 0.0027 | 0.0021 | Sn: 0.03 |
| 23 | 0.0024 | 3.3 | 1.8 | 0.01 | 0.0019 | 0.7 | 0.0024 | 0.0016 | 0.0014 | 0.0027 | 0.0021 | Sn: 0.03 |
| 24 | 0.0018 | 3.5 | 0.2 | 0.01 | 0.0015 | 0.9 | 0.0021 | 0.0012 | 0.0009 | 0.0027 | 0.0021 | Sb: 0.05 |
| 25 | 0.0017 | 3.6 | 0.5 | 0.01 | 0.0024 | 0.8 | 0.0027 | 0.0016 | 0.0014 | 0.0027 | 0.0021 | — |
| 26 | 0.0017 | 3.6 | 0.5 | 0.01 | 0.0026 | 0.8 | 0.0027 | 0.0016 | 0.0014 | 0.0027 | 0.0021 | — |
| 27 | 0.0017 | 3.6 | 0.5 | 0.01 | 0.0027 | 0.8 | 0.0027 | 0.0016 | 0.0014 | 0.0027 | 0.0021 | — |
| 28 | 0.0025 | 3.3 | 0.6 | 0.01 | 0.0059 | 0.9 | 0.0019 | 0.0018 | 0.0013 | 0.0029 | 0.0026 | Sn: 0.04 |
| 29 | 0.0025 | 3.8 | 0.2 | 0.01 | 0.0015 | 0.5 | 0.0021 | 0.0041 | 0.0013 | 0.0029 | 0.0026 | Sn: 0.04 |
| 30 | 0.0025 | 3.8 | 0.2 | 0.01 | 0.0015 | 0.5 | 0.0021 | 0.0007 | 0.0038 | 0.0029 | 0.0026 | Sn: 0.04 |
| 31 | 0.0025 | 3.8 | 0.2 | 0.01 | 0.0015 | 0.5 | 0.0021 | 0.0007 | 0.0011 | 0.0064 | 0.0026 | Sn: 0.04 |
| 32 | 0.0025 | 3.8 | 0.2 | 0.01 | 0.0015 | 0.5 | 0.0021 | 0.0007 | 0.0011 | 0.0021 | 0.0065 | Sn: 0.04 |
| 33 | 0.0021 | 4.1 | 0.5 | 0.01 | 0.0023 | 0.7 | 0.0024 | 0.0012 | 0.0013 | 0.0023 | 0.0022 | Sn: 0.03 |
| 34 | 0.0021 | 4.1 | 0.5 | 0.01 | 0.0023 | 0.7 | 0.0024 | 0.0012 | 0.0013 | 0.0023 | 0.0022 | Sn: 0.03 |
| 35 | 0.0021 | 4.1 | 0.5 | 0.01 | 0.0023 | 0.7 | 0.0024 | 0.0012 | 0.0013 | 0.0023 | 0.0022 | Sn: 0.03 |
| 36 | 0.0026 | 3.4 | 0.9 | 0.01 | 0.0026 | 1.4 | 0.0019 | 0.0018 | 0.0012 | 0.0021 | 0.0023 | Sn: 0.03 |
| 37 | 0.0026 | 3.4 | 0.9 | 0.01 | 0.0026 | 1.4 | 0.0019 | 0.0018 | 0.0012 | 0.0021 | 0.0023 | Sn: 0.03 |
| 38 | 0.0026 | 3.4 | 0.9 | 0.01 | 0.0026 | 1.4 | 0.0019 | 0.0018 | 0.0012 | 0.0021 | 0.0023 | Sn: 0.03 |
| 39 | 0.0025 | 3.7 | 0.8 | 0.01 | 0.0021 | 0.8 | 0.0021 | 0.0013 | 0.0013 | 0.0032 | 0.0031 | Sn: 0.03 |
| 40 | 0.0024 | 2.9 | 0.8 | 0.008 | 0.0026 | 1.6 | 0.0034 | 0.0016 | 0.0011 | 0.0028 | 0.0021 | Sn: 0.03 |
| 41 | 0.0024 | 3.4 | 0.6 | 0.005 | 0.0021 | 0.9 | 0.0024 | 0.0014 | 0.0014 | 0.0021 | 0.0025 | Sn: 0.01 |

TABLE 6-continued

| | | | | | | | | | | | | |
|---|---|---|---|---|---|---|---|---|---|---|---|---|
| 42 | 0.0024 | 3.6 | 0.4 | 0.01 | 0.0018 | 0.9 | 0.0045 | 0.0014 | 0.0014 | 0.0021 | 0.0025 | Sn: 0.04 |
| 43 | 0.0029 | 3.5 | 0.3 | 0.09 | 0.0019 | 1.2 | 0.0021 | 0.0011 | 0.0009 | 0.0025 | 0.0024 | Sn: 0.03 |
| 44 | 0.0028 | 3.5 | 0.3 | 0.11 | 0.0019 | 1.2 | 0.0022 | 0.0011 | 0.0009 | 0.0025 | 0.0024 | Sn: 0.03 |
| 45 | 0.0025 | 3.6 | 0.4 | 0.01 | 0.0018 | 0.8 | 0.0007 | 0.0011 | 0.0009 | 0.0024 | 0.0027 | Sn: 0.03 |
| 46 | 0.0025 | 3.6 | 0.4 | 0.01 | 0.0037 | 0.8 | 0.0013 | 0.0011 | 0.0009 | 0.0024 | 0.0027 | Sn: 0.03 |
| 47 | 0.0025 | 3.6 | 0.4 | 0.01 | 0.0018 | 0.8 | 0.0041 | 0.0011 | 0.0009 | 0.0024 | 0.0027 | Sn: 0.03 |
| 48 | 0.0025 | 3.6 | 0.4 | 0.01 | 0.0010 | 0.8 | 0.0021 | 0.0011 | 0.0009 | 0.0024 | 0.0027 | Sn: 0.03 |
| 49 | 0.0021 | 3.8 | 0.5 | 0.01 | 0.0019 | 0.6 | 0.0029 | 0.0013 | 0.0011 | 0.0025 | 0.0024 | — |
| 50 | 0.0021 | 3.8 | 0.5 | 0.01 | 0.0019 | 0.6 | 0.0029 | 0.0013 | 0.0011 | 0.0025 | 0.0024 | — |
| 51 | 0.0021 | 3.8 | 0.5 | 0.01 | 0.0019 | 0.6 | 0.0029 | 0.0013 | 0.0011 | 0.0025 | 0.0024 | — |
| 52 | 0.0021 | 3.8 | 0.5 | 0.01 | 0.0019 | 0.6 | 0.0029 | 0.0013 | 0.0011 | 0.0025 | 0.0024 | — |
| 53 | 0.0025 | 3.6 | 0.4 | 0.01 | 0.0018 | 0.8 | 0.0021 | 0.0011 | 0.0009 | 0.0024 | 0.0027 | — |
| 54 | 0.0025 | 3.6 | 0.4 | 0.01 | 0.0018 | 0.8 | 0.0021 | 0.0011 | 0.0009 | 0.0024 | 0.0027 | — |
| 55 | 0.0025 | 3.6 | 0.4 | 0.01 | 0.0018 | 0.8 | 0.0021 | 0.0011 | 0.0009 | 0.0024 | 0.0027 | — |
| 56 | 0.0025 | 3.6 | 0.4 | 0.01 | 0.0018 | 0.8 | 0.0021 | 0.0011 | 0.0009 | 0.0024 | 0.0027 | — |
| 57 | 0.0028 | 3.2 | 0.8 | 0.01 | 0.0024 | 1.8 | 0.0024 | 0.0008 | 0.0012 | 0.0021 | 0.0020 | — |
| 58 | 0.0028 | 3.2 | 0.8 | 0.01 | 0.0024 | 1.8 | 0.0024 | 0.0008 | 0.0012 | 0.0021 | 0.0020 | — |
| 59 | 0.0028 | 3.2 | 0.8 | 0.01 | 0.0024 | 1.8 | 0.0024 | 0.0008 | 0.0012 | 0.0021 | 0.0020 | — |
| 60 | 0.0028 | 3.2 | 0.8 | 0.01 | 0.0024 | 1.8 | 0.0024 | 0.0008 | 0.0012 | 0.0021 | 0.0020 | — |
| 61 | 0.0029 | 3.5 | 0.3 | 0.09 | 0.0019 | 1.2 | 0.0021 | 0.0011 | 0.0009 | 0.0025 | 0.0024 | — |
| 62 | 0.0029 | 3.5 | 0.3 | 0.09 | 0.0019 | 1.2 | 0.0021 | 0.0011 | 0.0009 | 0.0025 | 0.0024 | — |
| 63 | 0.0029 | 3.5 | 0.3 | 0.09 | 0.0019 | 1.2 | 0.0021 | 0.0011 | 0.0009 | 0.0025 | 0.0024 | — |
| 64 | 0.0029 | 3.5 | 0.3 | 0.09 | 0.0019 | 1.2 | 0.0021 | 0.0011 | 0.0009 | 0.0025 | 0.0024 | — |
| 65 | 0.0021 | 3.8 | 0.5 | 0.01 | 0.0019 | 0.6 | 0.0029 | 0.0013 | 0.0011 | 0.0025 | 0.0024 | — |
| 66 | 0.0025 | 3.6 | 0.4 | 0.01 | 0.0018 | 0.8 | 0.0021 | 0.0011 | 0.0009 | 0.0024 | 0.0027 | — |
| 67 | 0.0025 | 3.6 | 0.4 | 0.01 | 0.0018 | 0.8 | 0.0021 | 0.0011 | 0.0009 | 0.0024 | 0.0027 | — |
| 68 | 0.0025 | 3.6 | 0.4 | 0.01 | 0.0018 | 0.8 | 0.0021 | 0.0011 | 0.0009 | 0.0024 | 0.0027 | — |
| 69 | 0.0021 | 3.8 | 0.5 | 0.01 | 0.0019 | 0.6 | 0.0029 | 0.0013 | 0.0011 | 0.0025 | 0.0024 | — |
| 70 | 0.0021 | 3.8 | 0.5 | 0.01 | 0.0019 | 0.6 | 0.0029 | 0.0013 | 0.0011 | 0.0025 | 0.0024 | — |
| 71 | 0.0021 | 3.8 | 0.5 | 0.01 | 0.0019 | 0.6 | 0.0029 | 0.0013 | 0.0011 | 0.0025 | 0.0024 | — |
| 72 | 0.0021 | 3.8 | 0.5 | 0.01 | 0.0019 | 0.6 | 0.0029 | 0.0013 | 0.0011 | 0.0025 | 0.0024 | — |

| | Component composition (mass %) | | | | |
|---|---|---|---|---|---|
| Steel | Ca, Mg, REM | Cr, Co, Ni, Cu | Mo, W | (Zn/65)/(S/32) | Remarks |
| 1 | — | — | — | 0.57 | Inventive Steel |
| 2 | — | — | — | 0.57 | Inventive Steel |
| 3 | — | — | — | 0.57 | Inventive Steel |
| 4 | — | — | — | 0.57 | Inventive Steel |
| 5 | — | — | — | 0.08 | Comparative Steel |
| 6 | — | — | — | 0.75 | Inventive Steel |
| 7 | — | — | — | 0.75 | Inventive Steel |
| 8 | — | — | — | 0.75 | Inventive Steel |
| 9 | — | — | — | 0.75 | Inventive Steel |
| 10 | — | — | — | 0.75 | Inventive Steel |
| 11 | — | — | — | 0.75 | Inventive Steel |
| 12 | — | — | — | 0.49 | Inventive Steel |
| 13 | — | — | — | 0.49 | Inventive Steel |
| 14 | — | — | — | 0.43 | Comparative Steel |
| 15 | — | — | — | 0.31 | Comparative Steel |
| 16 | — | — | — | 0.85 | Inventive Steel |
| 17 | — | — | — | 0.89 | Inventive Steel |
| 18 | — | — | — | 0.78 | Comparative Steel |
| 19 | — | — | — | 0.61 | Inventive Steel |
| 20 | — | — | — | 0.61 | Inventive Steel |
| 21 | — | — | — | 0.47 | Comparative Steel |
| 22 | — | — | — | 0.62 | Inventive Steel |
| 23 | — | — | — | 0.62 | Inventive Steel |
| 24 | — | — | — | 0.69 | Inventive Steel |
| 25 | Ca: 0.0034 | — | — | 0.55 | Inventive Steel |
| 26 | Mg: 0.0025 | — | — | 0.51 | Inventive Steel |
| 27 | REM: 0.0072 | — | — | 0.49 | Inventive Steel |
| 28 | — | — | — | 0.16 | Comparative Steel |
| 29 | — | — | — | 0.69 | Comparative Steel |
| 30 | — | — | — | 0.69 | Comparative Steel |
| 31 | — | — | — | 0.69 | Comparative Steel |
| 32 | — | — | — | 0.69 | Comparative Steel |
| 33 | — | — | — | 0.51 | Inventive Steel |
| 34 | — | — | — | 0.51 | Inventive Steel |
| 35 | — | — | — | 0.51 | Inventive Steel |
| 36 | — | — | — | 0.36 | Inventive Steel |
| 37 | — | — | — | 0.36 | Inventive Steel |
| 38 | — | — | — | 0.36 | Inventive Steel |
| 39 | Ca: 0.0029 | — | — | 0.49 | Inventive Steel |
| 40 | — | — | — | 0.64 | Inventive Steel |
| 41 | — | — | — | 0.56 | Inventive Steel |
| 42 | — | — | — | 1.23 | Inventive Steel |
| 43 | — | — | — | 0.54 | Inventive Steel |

TABLE 6-continued

| | | | | |
|---|---|---|---|---|
| 44 | — | — | — | 0.57 | Comparative Steel |
| 45 | — | — | — | 0.19 | Inventive Steel |
| 46 | — | — | — | 0.17 | Inventive Steel |
| 47 | — | — | — | 1.12 | Inventive Steel |
| 48 | — | — | — | 1.03 | Inventive Steel |
| 49 | — | Cr: 0.05 | — | 0.75 | Inventive Steel |
| 50 | — | Cr: 0.1 | — | 0.75 | Inventive Steel |
| 51 | — | Cr: 0.5 | — | 0.75 | Inventive Steel |
| 52 | — | Cr: 0.9 | — | 0.75 | Inventive Steel |
| 53 | — | Co: 0.05 | — | 0.57 | Inventive Steel |
| 54 | — | Co: 0.1 | — | 0.57 | Inventive Steel |
| 55 | — | Co: 0.5 | — | 0.57 | Inventive Steel |
| 56 | — | Co: 0.9 | — | 0.57 | Inventive Steel |
| 57 | — | Ni: 0.05 | — | 0.49 | Inventive Steel |
| 58 | — | Ni: 0.1 | — | 0.49 | Inventive Steel |
| 59 | — | Ni: 0.5 | — | 0.49 | Inventive Steel |
| 60 | — | Ni: 0.9 | — | 0.49 | Inventive Steel |
| 61 | — | Cu: 0.05 | — | 0.54 | Inventive Steel |
| 62 | — | Cu: 0.1 | — | 0.54 | Inventive Steel |
| 63 | — | Cu: 0.5 | — | 0.54 | Inventive Steel |
| 64 | — | Cu: 0.05 | — | 0.54 | Inventive Steel |
| 65 | — | Cr: 0.3, Ni: 0.3 | — | 0.75 | Inventive Steel |
| 66 | — | Co: 0.3, Cu: 0.3 | — | 0.57 | Inventive Steel |
| 67 | — | Ni: 0.3, Cu: 0.3 | — | 0.57 | Inventive Steel |
| 68 | — | Cr: 0.3, Cu: 0.3 | — | 0.57 | Inventive Steel |
| 69 | — | — | Mo: 0.0025 | 0.75 | Inventive Steel |
| 70 | — | — | Mo: 0.05 | 0.75 | Inventive Steel |
| 71 | — | — | W: 0.0025 | 0.75 | Inventive Steel |
| 72 | — | — | W: 0.05 | 0.75 | Inventive Steel |

A JIS No. 5 tensile test specimen having a tensile direction in the rolling direction is taken out from the thus-obtained finish-annealed sheet, and a tensile test is conducted according to JIS Z 2241 to measure an upper yield point.

Also, test specimens with a length of 180 mm and a width of 30 mm are cut out from the rolling direction (L-direction) and the direction perpendicular to the rolling direction (C-direction) of the finish-annealed sheet, and subjected to a heat treatment simulating a stress-relief annealing under various conditions shown in Table 7 to measure iron loss $W_{10/400}$ in (L+C) directions by an Epstein test.

Furthermore, the test specimens after the stress-relief annealing is subjected to an electrolytic extraction method to measure the content $N_1$ (mass %) of nitrogen (N as AlN) present as AlN in a layer from one-side surface of the steel sheet to 1/20 of the sheet thickness and the content $N_2$ (mass %) of nitrogen (N as AlN) forming AlN in the full sheet thickness.

The measurement results are also shown in Table 7. As seen from these results, all the steel sheets that are produced by the raw steel materials having the component compositions conforming to aspects of the invention under the conditions conforming to aspects of the invention have a yield stress after the finish annealing of not less than 480 MPa and such excellent iron loss properties that the iron loss $W_{10/400}$ after the stress-relief annealing satisfies the above equation (3) according to aspects of the invention.

TABLE 7

| Steel No. | Final sheet thickness t (mm) | Finish annealing Temp. (° C.) | Finish annealing Time (sec) | Yield stress after finish annealing (MPa) | Stress-relief annealing Temp. (° C.) | Stress-relief annealing Time (hr) | Stress-relief annealing Atmosphere gas (vol %) | Dew point (° C.) | N as AlN in steel 1/20 layer $N_1$ (mass %) |
|---|---|---|---|---|---|---|---|---|---|
| 1 | 0.25 | 800 | 10 | 550 | 850 | 1 | N2:H2 = 20:80 | −55 | 0.0032 |
| 2 | 0.30 | 800 | 10 | 550 | 850 | 1 | N2:H2 = 20:80 | −55 | 0.0029 |
| 3 | 0.20 | 800 | 10 | 550 | 850 | 1 | N2:H2 = 20:80 | −55 | 0.0035 |
| 4 | 0.15 | 800 | 10 | 550 | 850 | 1 | N2:H2 = 20:80 | −55 | 0.0037 |
| 5 | 0.25 | 800 | 10 | 550 | 850 | 1 | N2:H2 = 20:80 | −55 | 0.0061 |
| 6 | 0.25 | 800 | 10 | 550 | 850 | 1 | N2 = 100 | −50 | 0.0082 |
| 7 | 0.25 | 780 | 10 | 565 | 825 | 1 | H2 = 100 | −50 | 0.0024 |
| 8 | 0.20 | 780 | 10 | 565 | 825 | 1 | Ar = 100 | −50 | 0.0024 |
| 9 | 0.25 | 780 | 10 | 565 | 825 | 1 | H2 = 100 | −8 | 0.0071 |
| 10 | 0.25 | 1000 | 10 | 450 | 825 | 2 | H2 = 100 | −50 | 0.0068 |
| 11 | 0.25 | 750 | 10 | 585 | 800 | 2 | H2:Ar = 20:80 | −60 | 0.0024 |
| 12 | 0.27 | 760 | 10 | 535 | 825 | 1 | H2:Ar = 20:80 | −50 | 0.0019 |
| 13 | 0.25 | 810 | 10 | 580 | 825 | 1 | H2:Ar = 20:80 | −50 | 0.0020 |
| 14 | Unable to produce due to slab cracking | | | — | — | — | — | — | — |
| 15 | Unable to produce due to slab cracking | | | — | — | — | — | — | — |
| 16 | 0.25 | 850 | 10 | 570 | 900 | 1 | H2 = 100 | −45 | 0.0027 |
| 17 | 0.25 | 880 | 10 | 600 | 900 | 1 | H2 = 100 | −45 | 0.0027 |
| 18 | Unable to produce due to slab cracking | | | — | — | — | — | — | — |
| 19 | 0.30 | 820 | 10 | 580 | 825 | 1 | N2:H2 = 10:90 | −50 | 0.0026 |

TABLE 7-continued

| Steel No. | | | | | | | | | |
|---|---|---|---|---|---|---|---|---|---|
| 20 | 0.20 | 820 | 10 | 595 | 825 | 1 | N2:H2 = 10:90 | −50 | 0.0026 |
| 21 | Unable to produce due to sheet breakage in cold rolling | | | — | — | — | — | — | — |
| 22 | 0.25 | 810 | 10 | 550 | 850 | 1 | N2:H2 = 20:80 | −55 | 0.0024 |
| 23 | 0.25 | 810 | 10 | 560 | 850 | 1 | N2:H2 = 20:80 | −55 | 0.0025 |
| 24 | 0.27 | 790 | 10 | 530 | 825 | 1 | N2:H2 = 10:90 | −58 | 0.0025 |
| 25 | 0.25 | 790 | 10 | 540 | 825 | 1 | N2:H2 = 10:90 | −60 | 0.0023 |
| 26 | 0.25 | 790 | 10 | 540 | 825 | 1 | N2:H2 = 10:90 | −60 | 0.0023 |
| 27 | 0.25 | 790 | 10 | 540 | 825 | 1 | N2:H2 = 10:90 | −60 | 0.0023 |
| 28 | 0.25 | 820 | 10 | 520 | 820 | 1 | N2:H2 = 20:80 | −50 | 0.0027 |
| 29 | 0.25 | 820 | 10 | 545 | 820 | 1 | N2:H2 = 20:80 | −50 | 0.0031 |
| 30 | 0.25 | 820 | 10 | 545 | 820 | 1 | N2:H2 = 20:80 | −50 | 0.0035 |
| 31 | 0.25 | 820 | 10 | 545 | 820 | 1 | N2:H2 = 20:80 | −50 | 0.0036 |
| 32 | 0.25 | 820 | 10 | 545 | 820 | 1 | N2:H2 = 20:80 | −50 | 0.0081 |
| 33 | 0.20 | 800 | 10 | 595 | 830 | 1 | Ar = 100 | −54 | 0.0022 |
| 34 | 0.25 | 800 | 10 | 595 | 830 | 1 | H2:Ar = 20:80 | −54 | 0.0025 |
| 35 | 0.30 | 800 | 10 | 595 | 830 | 1 | N2:H2 = 20:80 | −54 | 0.0024 |
| 36 | 0.15 | 800 | 10 | 585 | 830 | 1 | N2:H2 = 20:80 | −59 | 0.0026 |
| 37 | 0.20 | 800 | 10 | 585 | 900 | 0.5 | Ar = 100 | −60 | 0.0023 |
| 38 | 0.25 | 800 | 10 | 585 | 850 | 1 | N2:H2 = 10:90 | −55 | 0.0024 |
| 39 | 0.25 | 800 | 10 | 580 | 850 | 2 | H2:Ar = 10:90 | −55 | 0.0031 |
| 40 | 0.25 | 800 | 10 | 525 | 850 | 1 | Ar = 100 | −50 | 0.0027 |
| 41 | 0.25 | 800 | 10 | 540 | 825 | 1 | Ar = 100 | −55 | 0.0028 |
| 42 | 0.25 | 800 | 10 | 555 | 850 | 1 | Ar = 100 | −55 | 0.0026 |
| 43 | 0.25 | 800 | 10 | 560 | 850 | 1 | Ar = 100 | −55 | 0.0026 |
| 44 | Unable to produce due to sheet breakage in cold rolling | | | — | — | — | — | — | — |
| 45 | 0.25 | 800 | 10 | 550 | 850 | 1 | N2:H2 = 20:80 | −55 | 0.0038 |
| 46 | 0.25 | 800 | 10 | 550 | 850 | 1 | N2:H2 = 20:80 | −55 | 0.0038 |
| 47 | 0.25 | 800 | 10 | 550 | 850 | 1 | N2:H2 = 20:80 | −55 | 0.0032 |
| 48 | 0.25 | 800 | 10 | 550 | 850 | 1 | N2:H2 = 20:80 | −55 | 0.0032 |
| 49 | 0.25 | 780 | 10 | 568 | 825 | 1 | H2 = 100 | −50 | 0.0024 |
| 50 | 0.25 | 780 | 10 | 570 | 825 | 1 | H2 = 100 | −50 | 0.0024 |
| 51 | 0.25 | 780 | 10 | 575 | 825 | 1 | H2 = 100 | −50 | 0.0024 |
| 52 | 0.25 | 780 | 10 | 578 | 825 | 1 | H2 = 100 | −50 | 0.0024 |
| 53 | 0.30 | 800 | 10 | 552 | 850 | 1 | N2:H2 = 20:80 | −55 | 0.0029 |
| 54 | 0.30 | 800 | 10 | 555 | 850 | 1 | N2:H2 = 20:80 | −55 | 0.0029 |
| 55 | 0.30 | 800 | 10 | 557 | 850 | 1 | N2:H2 = 20:80 | −55 | 0.0029 |
| 56 | 0.30 | 800 | 10 | 560 | 850 | 1 | N2:H2 = 20:80 | −55 | 0.0029 |
| 57 | 0.25 | 810 | 10 | 585 | 825 | 1 | H2:Ar = 20:80 | −50 | 0.0020 |
| 58 | 0.25 | 810 | 10 | 590 | 825 | 1 | H2:Ar = 20:80 | −50 | 0.0020 |
| 59 | 0.25 | 810 | 10 | 600 | 825 | 1 | H2:Ar = 20:80 | −50 | 0.0020 |
| 60 | 0.25 | 810 | 10 | 605 | 825 | 1 | H2:Ar = 20:80 | −50 | 0.0020 |
| 61 | 0.25 | 800 | 10 | 560 | 850 | 1 | Ar = 100 | −55 | 0.0026 |
| 62 | 0.25 | 800 | 10 | 562 | 850 | 1 | Ar = 100 | −55 | 0.0026 |
| 63 | 0.25 | 800 | 10 | 565 | 850 | 1 | Ar = 100 | −55 | 0.0026 |
| 64 | 0.25 | 800 | 10 | 570 | 850 | 1 | Ar = 100 | −55 | 0.0026 |
| 65 | 0.25 | 780 | 10 | 575 | 825 | 1 | H2 = 100 | −50 | 0.0024 |
| 66 | 0.30 | 800 | 10 | 560 | 850 | 1 | N2:H2 = 20:80 | −55 | 0.0029 |
| 67 | 0.30 | 800 | 10 | 565 | 850 | 1 | N2:H2 = 20:80 | −55 | 0.0029 |
| 68 | 0.30 | 800 | 10 | 560 | 850 | 1 | N2:H2 = 20:80 | −55 | 0.0029 |
| 69 | 0.25 | 780 | 10 | 565 | 825 | 1 | H2 = 100 | −50 | 0.0024 |
| 70 | 0.25 | 780 | 10 | 565 | 825 | 1 | H2 = 100 | −50 | 0.0024 |
| 71 | 0.25 | 780 | 10 | 565 | 825 | 1 | H2 = 100 | −50 | 0.0024 |
| 72 | 0.25 | 780 | 10 | 565 | 825 | 1 | H2 = 100 | −50 | 0.0024 |

| Steel No. | N as AlN in steel — Full sheet thickness $N_2$ (mass %) | N as AlN in steel — Ratio of precipitated nitrogen amount *1 | Iron loss after stress-relief annealing $W_{10/400}$ (W/kg) | Value in right side of equation (1) | Remarks |
|---|---|---|---|---|---|
| 1 | 0.0026 | 8.1 | 10.6 | 13.0 | Inventive Example |
| 2 | 0.0027 | 9.3 | 12.6 | 14.0 | Inventive Example |
| 3 | 0.0028 | 8.0 | 10.0 | 12.0 | Inventive Example |
| 4 | 0.0029 | 7.8 | 8.8 | 11.0 | Inventive Example |
| 5 | 0.0029 | 4.8 | 14.5 | 13.0 | Comparative Example |
| 6 | 0.0031 | 3.8 | 15.3 | 13.0 | Comparative Example |
| 7 | 0.0024 | 10.0 | 10.9 | 13.0 | Inventive Example |
| 8 | 0.0024 | 10.0 | 9.7 | 12.0 | Inventive Example |
| 9 | 0.0029 | 4.1 | 14.8 | 13.0 | Comparative Example |
| 10 | 0.0029 | 4.3 | 11.2 | 13.0 | Inventive Example |
| 11 | 0.0024 | 10.0 | 10.9 | 13.0 | Inventive Example |
| 12 | 0.0019 | 10.0 | 11.2 | 13.4 | Inventive Example |
| 13 | 0.0020 | 10.0 | 10.9 | 13.0 | Inventive Example |
| 14 | — | — | — | — | Comparative Example |
| 15 | — | — | — | — | Comparative Example |
| 16 | 0.0027 | 10.0 | 9.9 | 13.0 | Inventive Example |
| 17 | 0.0027 | 10.0 | 9.1 | 13.0 | Inventive Example |

TABLE 7-continued

| | | | | | |
|---|---|---|---|---|---|
| 18 | — | — | — | — | Comparative Example |
| 19 | 0.0024 | 9.2 | 11.9 | 14.0 | Inventive Example |
| 20 | 0.0024 | 9.2 | 9.2 | 12.0 | Inventive Example |
| 21 | — | — | — | — | Comparative Example |
| 22 | 0.0021 | 8.8 | 11.0 | 13.0 | Inventive Example |
| 23 | 0.0022 | 8.8 | 10.8 | 13.0 | Inventive Example |
| 24 | 0.0022 | 8.8 | 11.1 | 13.4 | Inventive Example |
| 25 | 0.0021 | 9.1 | 10.3 | 13.0 | Inventive Example |
| 26 | 0.0021 | 9.1 | 10.3 | 13.0 | Inventive Example |
| 27 | 0.0021 | 9.1 | 10.3 | 13.0 | Inventive Example |
| 28 | 0.0026 | 9.6 | 14.8 | 13.0 | Comparative Example |
| 29 | 0.0027 | 8.7 | 16.1 | 13.0 | Comparative Example |
| 30 | 0.0027 | 7.7 | 15.6 | 13.0 | Comparative Example |
| 31 | 0.0027 | 7.5 | 15.3 | 13.0 | Comparative Example |
| 32 | 0.0027 | 3.3 | 17.1 | 13.0 | Comparative Example |
| 33 | 0.0022 | 10.0 | 9.0 | 12.0 | Inventive Example |
| 34 | 0.0022 | 8.8 | 10.2 | 13.0 | Inventive Example |
| 35 | 0.0022 | 9.2 | 11.5 | 14.0 | Inventive Example |
| 36 | 0.0022 | 8.5 | 8.5 | 11.0 | Inventive Example |
| 37 | 0.0023 | 10.0 | 9.2 | 12.0 | Inventive Example |
| 38 | 0.0023 | 9.6 | 10.4 | 13.0 | Inventive Example |
| 39 | 0.0031 | 10.0 | 10.5 | 13.0 | Inventive Example |
| 40 | 0.0021 | 7.8 | 10.9 | 13.0 | Inventive Example |
| 41 | 0.0025 | 8.9 | 10.8 | 13.0 | Inventive Example |
| 42 | 0.0025 | 9.6 | 12.7 | 13.0 | Inventive Example |
| 43 | 0.0024 | 9.2 | 10.5 | 13.0 | Inventive Example |
| 44 | — | — | — | — | Comparative Example |
| 45 | 0.0026 | 6.8 | 12.8 | 13.0 | Inventive Example |
| 46 | 0.0026 | 6.8 | 12.4 | 13.0 | Inventive Example |
| 47 | 0.0026 | 8.1 | 12.7 | 13.0 | Inventive Example |
| 48 | 0.0026 | 8.1 | 12.1 | 13.0 | Inventive Example |
| 49 | 0.0024 | 10.0 | 10.8 | 13.0 | Inventive Example |
| 50 | 0.0024 | 10.0 | 10.7 | 13.0 | Inventive Example |
| 51 | 0.0024 | 10.0 | 10.7 | 13.0 | Inventive Example |
| 52 | 0.0024 | 10.0 | 10.6 | 13.0 | Inventive Example |
| 53 | 0.0027 | 9.3 | 12.5 | 14.0 | Inventive Example |
| 54 | 0.0027 | 9.3 | 12.4 | 14.0 | Inventive Example |
| 55 | 0.0027 | 9.3 | 12.3 | 14.0 | Inventive Example |
| 56 | 0.0027 | 9.3 | 12.3 | 14.0 | Inventive Example |
| 57 | 0.0020 | 10.0 | 10.8 | 13.0 | Inventive Example |
| 58 | 0.0020 | 10.0 | 10.7 | 13.0 | Inventive Example |
| 59 | 0.0020 | 10.0 | 10.6 | 13.0 | Inventive Example |
| 60 | 0.0020 | 10.0 | 10.5 | 13.0 | Inventive Example |
| 61 | 0.0024 | 9.2 | 10.4 | 13.0 | Inventive Example |
| 62 | 0.0024 | 9.2 | 10.4 | 13.0 | Inventive Example |
| 63 | 0.0024 | 9.2 | 10.3 | 13.0 | Inventive Example |
| 64 | 0.0024 | 9.2 | 10.3 | 13.0 | Inventive Example |
| 65 | 0.0024 | 10.0 | 10.6 | 13.0 | Inventive Example |
| 66 | 0.0027 | 9.3 | 12.3 | 14.0 | Inventive Example |
| 67 | 0.0027 | 9.3 | 12.3 | 14.0 | Inventive Example |
| 68 | 0.0027 | 9.3 | 12.3 | 14.0 | Inventive Example |
| 69 | 0.0024 | 10.0 | 10.8 | 13.0 | Inventive Example |
| 70 | 0.0024 | 10.0 | 10.8 | 13.0 | Inventive Example |
| 71 | 0.0024 | 10.0 | 10.8 | 13.0 | Inventive Example |
| 72 | 0.0024 | 10.0 | 10.8 | 13.0 | Inventive Example |

*1: $(t \times N_2)/\{(t/10) \times N_1\} = 10 \times (N_2/N_1)$

The invention claimed is:

1. A method for producing a non-oriented electrical steel sheet comprising
subjecting a steel slab having a component composition comprising C: not more than 0.0050 mass %, Si: 2.8 to 6.5 mass %, Mn: 0.05 to 2.0 mass %, P: not more than 0.10 mass %, S: not more than 0.0050 mass %, Al: 0.3 to 2 mass %, N: not more than 0.0050 mass %, Zn: 0.0005 to 0.0050 mass %, Ti: not more than 0.0030 mass %, Nb: not more than 0.0030 mass %, 0: not more than 0.0050 mass %, satisfying Si+Al≥4 mass % and the remainder being Fe and inevitable impurities to a hot rolling, a hot band annealing, a cold rolling and a finish annealing, characterized in that
a yield stress of the steel sheet after the finish annealing is made to not less than 480 MPa.

2. The method for producing a non-oriented electrical steel sheet according to claim 1, wherein
the steel slab has Zn and S contents that satisfy the following equation (1):

$$0.20 \leq (Zn/65)/(S/32) \leq 0.90 \quad (1).$$

3. The method for producing a non-oriented electrical steel sheet according to claim 2, wherein
a soaking temperature in the finish annealing is in the range of 700 to 900° C.

4. The method for producing a non-oriented electrical steel sheet according to claim 3, wherein
the steel slab contains at least one group selected from the following Groups A to D, in addition to the above component composition:
Group A: one or two selected from Sn: 0.005 to 0.20 mass % and Sb: 0.005 to 0.20 mass %;
Group B: one or more selected from Ca, Mg and REM by 0.0005 to 0.020 mass % in total;

Group C: one or more selected from Cr, Co, Ni and Cu by 0.01 to 1.0 mass % in total of; and Group D: one or two selected from Mo: 0.001 to 0.1 mass % and W: 0.001 to 0.1 mass %.

5. The method for producing a non-oriented electrical steel sheet according to claim 2, wherein the steel slab contains at least one group selected from the following Groups A to D, in addition to the above component composition:

Group A: one or two selected from Sn: 0.005 to 0.20 mass % and Sb: 0.005 to 0.20 mass %;

Group B: one or more selected from Ca, Mg and REM by 0.0005 to 0.020 mass % in total;

Group C: one or more selected from Cr, Co, Ni and Cu by 0.01 to 1.0 mass % in total of; and Group D: one or two selected from Mo: 0.001 to 0.1 mass % and W: 0.001 to 0.1 mass %.

6. A method for producing a motor core comprising taking out a rotor core material and a stator core material at the same time from a non-oriented electrical steel sheet produced by the method according to claim 2, laminating the rotor core material to form a rotor core, and laminating the stator core material followed by a stress-relief annealing to form a stator core, characterized in that the steel sheet constituting the stator core is subjected to the stress-relief annealing so that $N_1$, $N_2$ and t satisfy the following equation (2):

$$(t \times N_2)/\{(t/10) \times N_1\} \geq 5.0 \tag{2}$$

and that an iron loss $W_{10/400}$ (W/kg) satisfies the following equation (3) in relation to the sheet thickness t (mm):

$$W_{10/400} \leq 8 + 20 \times t \tag{3},$$

where $N_1$ (mass %) is a content of nitrogen present as AlN (N as AlN) in a layer from a one-side surface to 1/20 of a sheet thickness and $N_2$ (mass %) is a content of nitrogen present as AlN in a full sheet thickness (N as AlN) and t (mm) is a sheet thickness of the steel sheet.

7. The method for producing a motor core according to claim 6, wherein a soaking temperature in the stress-relief annealing is in the range of 780 to 950° C. and an atmosphere in the stress-relief annealing is a mixed gas of one or more selected from nitrogen gas, hydrogen gas and a noble gas and has a nitrogen content of not more than 30 vol % and a dew point of not higher than −20° C.

8. The method for producing a non-oriented electrical steel sheet according to claim 1, wherein a soaking temperature in the finish annealing is in the range of 700 to 900° C.

9. The method for producing a non-oriented electrical steel sheet according to claim 8, wherein the steel slab contains at least one group selected from the following Groups A to D, in addition to the above component composition:

Group A: one or two selected from Sn: 0.005 to 0.20 mass % and Sb: 0.005 to 0.20 mass %;

Group B: one or more selected from Ca, Mg and REM by 0.0005 to 0.020 mass % in total;

Group C: one or more selected from Cr, Co, Ni and Cu by 0.01 to 1.0 mass % in total of; and Group D: one or two selected from Mo: 0.001 to 0.1 mass % and W: 0.001 to 0.1 mass %.

10. A method for producing a motor core comprising taking out a rotor core material and a stator core material at the same time from a non-oriented electrical steel sheet produced by the method according to claim 8, laminating the rotor core material to form a rotor core, and laminating the stator core material followed by a stress-relief annealing to form a stator core, characterized in that the steel sheet constituting the stator core is subjected to the stress-relief annealing so that $N_1$, $N_2$ and t satisfy the following equation (2):

$$(t \times N_2)/\{(t/10) \times N_1\} \geq 5.0 \tag{2}$$

and that an iron loss $W_{10/400}$ (W/kg) satisfies the following equation (3) in relation to the sheet thickness t (mm):

$$W_{10/400} \leq 8 + 20 \times t \tag{3},$$

where $N_1$ (mass %) is a content of nitrogen present as AlN (N as AlN) in a layer from a one-side surface to 1/20 of a sheet thickness and $N_2$ (mass %) is a content of nitrogen present as AlN in a full sheet thickness (N as AlN) and t (mm) is a sheet thickness of the steel sheet.

11. The method for producing a motor core according to claim 10, wherein a soaking temperature in the stress-relief annealing is in the range of 780 to 950° C. and an atmosphere in the stress-relief annealing is a mixed gas of one or more selected from nitrogen gas, hydrogen gas and a noble gas and has a nitrogen content of not more than 30 vol % and a dew point of not higher than −20° C.

12. The method for producing a non-oriented electrical steel sheet according to claim 1, wherein the steel slab contains at least one group selected from the following Groups A to D, in addition to the above component composition:

Group A: one or two selected from Sn: 0.005 to 0.20 mass % and Sb: 0.005 to 0.20 mass %;

Group B: one or more selected from Ca, Mg and REM by 0.0005 to 0.020 mass % in total;

Group C: one or more selected from Cr, Co, Ni and Cu by 0.01 to 1.0 mass % in total of; and Group D: one or two selected from Mo: 0.001 to 0.1 mass % and W: 0.001 to 0.1 mass %.

13. A method for producing a motor core comprising taking out a rotor core material and a stator core material at the same time from a non-oriented electrical steel sheet produced by the method according to claim 12 laminating the rotor core material to form a rotor core, and laminating the stator core material followed by a stress-relief annealing to form a stator core, characterized in that the steel sheet constituting the stator core is subjected to the stress-relief annealing so that $N_1$, $N_2$ and t satisfy the following equation (2):

$$(t \times N_2)/\{(t/10) \times N_1\} \geq 5.0 \tag{2}$$

and that an iron loss $W_{10/400}$ (W/kg) satisfies the following equation (3) in relation to the sheet thickness t (mm):

$$W_{10/400} \leq 8 + 20 \times t \tag{3},$$

where $N_1$ (mass %) is a content of nitrogen present as AlN (N as AlN) in a layer from a one-side surface to 1/20 of a sheet thickness and $N_2$ (mass %) is a content of nitrogen present as AlN in a full sheet thickness (N as AlN) and t (mm) is a sheet thickness of the steel sheet.

14. The method for producing a motor core according to claim 13, wherein
a soaking temperature in the stress-relief annealing is in the range of 780 to 950° C. and an atmosphere in the stress-relief annealing is a mixed gas of one or more selected from nitrogen gas, hydrogen gas and a noble gas and has a nitrogen content of not more than 30 vol % and a dew point of not higher than −20° C.

15. A method for producing a motor core comprising
taking out a rotor core material and a stator core material at the same time from a non-oriented electrical steel sheet produced by the method according to claim 1,
laminating the rotor core material to form a rotor core, and
laminating the stator core material followed by a stress-relief annealing to form a stator core, characterized in that
the steel sheet constituting the stator core is subjected to the stress-relief annealing so that $N_1$, $N_2$ and t satisfy the following equation (2):

$$(t \times N_2)/\{(t/10) \times N_1\} \geq 5.0 \qquad (2)$$

and that an iron loss $W_{10/400}$ (W/kg) satisfies the following equation (3) in relation to the sheet thickness t (mm):

$$W_{10/400} \leq 8 + 20 \times t \qquad (3),$$

where $N_1$ (mass %) is a content of nitrogen present as AlN (N as AlN) in a layer from a one-side surface to 1/20 of a sheet thickness and $N_2$ (mass %) is a content of nitrogen present as AlN in a full sheet thickness (N as AlN) and t (mm) is a sheet thickness of the steel sheet.

16. The method for producing a motor core according to claim 15, wherein
a soaking temperature in the stress-relief annealing is in the range of 780 to 950° C. and an atmosphere in the stress-relief annealing is a mixed gas of one or more selected from nitrogen gas, hydrogen gas and a noble gas and has a nitrogen content of not more than 30 vol % and a dew point of not higher than −20° C.

17. A motor core constituted with
a rotor core made of a non-oriented electrical steel sheet having a component composition comprising C: not more than 0.0050 mass %, Si: 2.8 to 6.5 mass %, Mn: 0.05 to 2.0 mass %, P: not more than 0.10 mass %, S: not more than 0.0050 mass %, Al: 0.3 to 2 mass %, N: not more than 0.0050 mass %, Zn: 0.0005 to 0.0050 mass %, Ti: not more than 0.0030 mass %, Nb: not more than 0.0030 mass %, O: not more than 0.0050 mass %, satisfying Si+Al≥4 mass % and the remainder being Fe and inevitable impurities and
a stator core made of the same non-oriented electrical steel sheet,
characterized in that
the steel sheet constituting the rotor core has a yield stress of not less than 480 MPa;
$N_1$, $N_2$ and t in the steel sheet constituting the stator core satisfy the following equation (2):

$$(t \times N_2)/\{(t/10) \times N_1\} \geq 5.0 \qquad (2),$$

where $N_1$ (mass %) is a content of nitrogen present as AlN (N as AlN) in a layer from a one-side surface to 1/20 of a sheet thickness and $N_2$ (mass %) is a content of nitrogen present as AlN in a full sheet thickness (N as AlN) and t (mm) is a sheet thickness of the steel sheet; and
an iron loss $W_{10/400}$ (W/kg) satisfies the following equation (3) in relation to the sheet thickness t (mm):

$$W_{10/400} \leq 8 + 20 \times t \qquad (3).$$

18. The motor core according to claim 17, wherein
the non-oriented electrical steel sheet has Zn and S contents satisfying the following equation (1):

$$0.20 \leq (Zn/65)/(S/32) \leq 0.90 \qquad (1).$$

19. The motor core according to claim 18, wherein
the non-oriented electrical steel sheet contains at least one group selected from following Groups A to D in addition to the above component composition:
Group A: one or two selected from Sn: 0.005 to 0.20 mass % and Sb: 0.005 to 0.20 mass %;
Group B: one or more selected from Ca, Mg and REM by 0.0005 to 0.020 mass % in total;
Group C: one or more selected from Cr, Co, Ni and Cu by 0.01 to 1.0 mass % in total; and
Group D: one or two selected from Mo: 0.001 to 0.1 mass % and W: 0.001 to 0.1 mass %.

20. The motor core according to claim 17, wherein
the non-oriented electrical steel sheet contains at least one group selected from following Groups A to D in addition to the above component composition:
Group A: one or two selected from Sn: 0.005 to 0.20 mass % and Sb: 0.005 to 0.20 mass %;
Group B: one or more selected from Ca, Mg and REM by 0.0005 to 0.020 mass % in total;
Group C: one or more selected from Cr, Co, Ni and Cu by 0.01 to 1.0 mass % in total; and
Group D: one or two selected from Mo: 0.001 to 0.1 mass % and W: 0.001 to 0.1 mass %.

* * * * *

UNITED STATES PATENT AND TRADEMARK OFFICE
CERTIFICATE OF CORRECTION

PATENT NO. : 11,962,184 B2
APPLICATION NO. : 17/617732
DATED : April 16, 2024
INVENTOR(S) : Yoshiaki Zaizen et al.

It is certified that error appears in the above-identified patent and that said Letters Patent is hereby corrected as shown below:

In the Drawings

In Figure 5 - the horizontal axis in Figure 5 should be changed from "Nitrogen partial pressure of atmosphere in stress-relief annealing (°C)" to "Dew point (°C) of atmosphere in stress-relief annealing".

In the Claims

Claim 1, Column 21, Line 59 "0:" should be -- O: --.

Claim 8, Column 25, Line 49 "0:" should be -- O: --.

Signed and Sealed this
Eighth Day of October, 2024

Katherine Kelly Vidal
*Director of the United States Patent and Trademark Office*